United States Patent [19]

Aoki et al.

[11] Patent Number: 5,599,627
[45] Date of Patent: Feb. 4, 1997

[54] MAGNETIC PARTICLES COMPRISING MAGNETITE CORE AND PROCESS FOR PRODUCING THE SAME

[75] Inventors: Koso Aoki, Hiroshima; Hiromitsu Misawa, Hatsukaichi; Yoji Okano, Hiroshima; Minoru Kozawa, Higashihiroshima; Naoki Uchida, Ohtake; Kazuo Fujioka, Hiroshima, all of Japan

[73] Assignee: Toda Kogyo Corporation, Japan

[21] Appl. No.: 318,493

[22] Filed: Oct. 4, 1994

[30] Foreign Application Priority Data

| Oct. 8, 1993 | [JP] | Japan | 5-277483 |
| Feb. 25, 1994 | [JP] | Japan | 6-052995 |
| Feb. 25, 1994 | [JP] | Japan | 6-052996 |

[51] Int. Cl.$^6$ .................................................. B32B 5/16
[52] U.S. Cl. .................... 428/403; 252/62.59; 428/404; 428/694 BA; 428/701; 428/702; 428/900
[58] Field of Search .................................. 428/403, 404, 428/694 BA, 699, 701, 702, 900, 402; 252/62.59

[56] References Cited

U.S. PATENT DOCUMENTS

| 4,390,361 | 6/1983 | Sueyoshi et al. | 75/0.5 |
| 4,497,907 | 2/1985 | Halluin et al. | 502/238 |
| 4,740,443 | 4/1988 | Nakahara et al. | 430/106.6 |
| 4,956,220 | 9/1990 | Sueyoshi et al. | 428/141 |
| 5,356,712 | 10/1994 | Hashiuchi et al. | 428/404 |
| 5,389,482 | 2/1995 | Okano et al. | 430/106.6 |
| 5,411,830 | 5/1995 | Matsunaga | 430/166.6 |

FOREIGN PATENT DOCUMENTS

| 0238069 | 9/1987 | European Pat. Off. |
| 0468525 | 1/1992 | European Pat. Off. |
| 51-124124 | 10/1976 | Japan . |
| 52-37930 | 3/1977 | Japan . |
| 54-139544 | 10/1979 | Japan . |
| 55-94968 | 7/1980 | Japan . |
| 61-53660 | 3/1986 | Japan . |
| 63-178256 | 7/1988 | Japan . |
| 1-298030 | 12/1989 | Japan . |
| 2-73367 | 3/1990 | Japan . |
| 2-97968 | 4/1990 | Japan . |
| 3-9045 | 2/1991 | Japan . |
| 3-131865 | 6/1991 | Japan . |
| 3-131863 | 6/1991 | Japan . |
| 4-162051 | 6/1992 | Japan . |
| 5-72081 | 3/1993 | Japan . |
| 5-213620 | 8/1993 | Japan . |

OTHER PUBLICATIONS

*Patent Abstracts of Japan*, vol. 17, No. 659 7 Dec. 1993 & JP-A-05 213 620 (Mitsui Mining & Smelting Co.) 24 Aug. 1993 (Abstract).

Primary Examiner—Hoa T. Le
Attorney, Agent, or Firm—Nixon & Vanderhye

[57] ABSTRACT

Magnetic toner particles composed of magnetite core particles containing 0.10 to 1.00 wt % silicon and a hydrous coprecipiate of silica and alumina deposited or adhered on the surfaces of the magnetite core particles. The magnetic toner particles have an area-average diameter of 0.05 to 1.0 μm.

9 Claims, No Drawings

MAGNETIC PARTICLES COMPRISING MAGNETITE CORE AND PROCESS FOR PRODUCING THE SAME

BACKGROUND OF THE INVENTION

The present invention relates to magnetic particles and a process for producing the magnetic particles, and more in detailed, the present invention relates to magnetic particles for a magnetic toner which have a high fluidity, a low oil absorption, an excellent charging stability and a good initial dispersibility, and a process for producing such magnetic particles. The present invention also relates to iron oxide particles and a process for producing the iron oxide particles, and more in detailed, the present invention relates to iron oxide particles having a low oil absorption and an excellent initial dispersibility, which are suited for use as a coloring pigment for coating materials, inks and resins, and a process for producing such iron oxide particles.

Hitherto, a development method of using as a developer composite particles prepared by mixing and dispersing magnetic particles such as magnetite particles in a resin without using a carrier, so-called one-component magnetic toner, has been widely known and used as one of the electrostatic latent image development methods.

With the enhancement of the image qualities such as image density and gradient and the increase of printing speed of the copying machines in the recent years, more improvements of the properties of the magnetic toner used as a developer are demanded. That is, a magnetic toner is required to have an improved developing-stability so as to allow copying with a uniform image density, a high durability so as to enable clear and uniform copying even after repetition of copying, an excellent environmental stability so as to allow normal copying even under the low-temperature and low-humidity condition or high-temperature and high-humidity condition, as well as excellent fluidity and charging stability.

Regarding the durability of magnetic toner, Japanese Patent Application Laid-Open (KOKAI) No. 4-162051 states: "Further, since the copying machines are trending toward nigher printing speed, a toner is required to satisfy the high-level requirements for high resolution, high-speed development, high durability, etc. . . ."

As to the developing stability and fluidity of magnetic toner, Japanese Patent Application Laid-Open (KOKAI) No. 53-94932 describes: "Such high-resistance magnetic toner is poor in fluidity because of high resistance and tends to cause uneven development. That is, the high-resistance toner for PPC can retain the electric charges necessary for transfer, but since there remains a small amount of charges in the toner bottle or on the surfaces of the magnetic rolls even in the steps (other than the transfer step) where no charging is necessary, due to the frictional charging or mechanoelectret in the toner producing process, the agglomeration of particles tends to take place, thereby causing lowering of fluidity." and "Another object of the present invention is to provide a high-resistance toner for PPC having an improved fluidity to obtain high-quality indirect photocopies with no unevenness of development, hence with excellent resolution and gradient."

Concerning the environmental stability, the fluidity and the charging stability of magnetic toner, Japanese Patent Application Laid-Open (KOKAI) No. 63-139367 states: "In the method using such a dry developer, in order to form a high-quality visible image, the developer is required to have a high fluidity and uniform charging properties, and for this reason, it has been generally practiced to add and mix fine silica particles with toner particles. However, since the silica particles are per se hydrophilic, the developer particles incorporated with the said silica particles tend to agglomerate with the aid of moisture in the air, resulting in reduced fluidity of the developer, and in certain cases, the charging efficiency of the developer may even be lowered due to moisture absorption of silica. . . . . . It is required that the good copying quality be maintained even when the copies are left under a high-humidity condition for a long time, and in this respect, the conventional hydrophobic silica particles were unsatisfactory." and "An object of the present invention is to provide a statically charged developer which is stable against changes of environmental factors such as high or low temperature and humidity, and able to maintain and show the good and excellent properties."

There is a close relation between the properties of the magnetic toner and the properties of the magnetic particles dispersed in the magnetic toner. For improving the developing stability, the durability and the environmental stability of the magnetic toner, it is required that the magnetic particles used for the toner have a good miscibility with the resin and be minimized in oil absorption, as pointed out in Japanese Patent Application Laid-Open (KOKAI) No. 55-65406 which states: "Generally, the magnetic particles for such single-component magnetic toner are required to meet the following property requirements: . . . . . . (VII) To have a good miscibility with resin. The toner particle size is usually not more than 10 μm, and the microscopic mixing degree in the toner is of much significance for the toner properties."

As for the fluidity of magnetic toner, since it greatly depends on the surface condition of the magnetic particles exposed on the magnetic toner surfaces, it is strongly required that the magnetic particles are excellent in fluidity.

The charging stability of magnetic toner is greatly dependent on distribution of the charge on the magnetic particles exposed on the magnetic toner particle surfaces, so that it is keenly required that the distribution of the charge on the magnetic particles be minimized.

Further, since the fluidity and charging stability of magnetic toner are greatly dependent on the surface condition and uniformity of the charging of the magnetic particles as mentioned above, it is necessary to maintain the surface condition and charging stability of the magnetic particles in a favorable state throughout the magnetic toner production process. For this, it is emphatically required that the good initial dispersion be secured in kneading of the magnetic particles with resin.

Various attempts have been made for improving the properties of the magnetic particles contained in resin so as to improve the properties of magnetic toner. For example, the following methods have been proposed:

(1) A water-soluble silicate is added in the course of the reaction for producing the magnetite particles of various shapes by a wet process, in which an oxidation reaction is carried out by passing an oxygen-containing gas through a suspension containing colloidal ferrous hydroxide obtained from the reaction of an aqueous ferrous salt solution and an aqueous alkaline solution (Japanese Patent Publication (KOKOKU) No. 3-9045 and Japanese Patent Application Laid-Open (KOKAI) Nos. 3-131863 and 5-72801).

For example, Japanese Patent Publication (KOKOKU) No. 3-9045 discloses "Spherical magnetite particles having bulk density of 0.40 to 1.00 $g/cm^3$, containing Si in amount of 0.1 to. 5.0 atom % based on Fe and having an excellent temperature stability" and "In a production of spherical magnetite particles which comprises passing an oxygen-containing gas through a ferrous salt reaction solution containing colloidal ferrous hydroxide obtained by reacting an aqueous ferrous salt solution and an alkali hydroxide of an amount of 0.80 to 0.99 equivalent to $Fe^{2+}$ in said ferrous salt solution, the magnetite particles production comprising the first stage in which a water-soluble silicate is added in an amount of 0.1 to 5.0 atom % (calculated as Si) based on Fe, to the said alkali hydroxide or the said aqueous ferrous salt solution containing colloidal ferrous hydroxide, and then an oxygen-containing gas is passed through the resultant solution under heating at 70° to 100° C., thereby producing the spherical magnetite particles from said colloidal ferrous hydroxide, and the second stage in which an alkali hydroxide is added in an amount of not less than 1.00 equivalent to residual $Fe^{2+}$ and oxidation under heating is further carried out under the same conditions as in the first stage."

(2) A silicon compound is contained in the inside of the spherical magnetite particles and also exposed at the surfaces thereof (Japanese Patent Application Laid-Open (KOKAI) No. 5-213620).

Specifically, the above Japanese Patent Application Laid-Open (KOKAI) No. 5-213620 proposes "Magnetite particles having a silicon compound incorporated therein and exposed at the particle surfaces" and "A process for producing magnetite particles which comprises adding a silicon compound to a solution containing a ferrous salt as a main ingredient, mixing an alkali in an amount of 1.0 to 1.1 equivalent, carrying out an oxidation reaction while maintaining pH at 7 to 10, supplying deficient iron in an amount of 0.9 to 1.2 equivalent to the initial alkali in the course of reaction, and continuing the oxidation reaction at pH 6 to 10."

(3) An a hydroxide of aluminum and/or an oxide of aluminum are deposited on the surfaces of the magnetite particles of various shapes produced by a wet process (Japanese Patent Application Laid-Open (KOKAI) Nos. 54-139544, 61-53660, 2-73367 and 4-162051).

For example, Japanese Patent Application Laid-Open (KOKAI) No. 61-53660 proposes "A process for producing a magnetic developer which comprises mixing a magnetic powder with a binder resin and granulating the obtained mixture, characterized in that alumina is deposited on the surface of the magnetic powder to an amount of 0.1 to 1%."

(4) Fine zirconia particles are deposited on the magnetic particle surfaces, and an oxide layer containing Al and/or Si is formed on the zirconia particle-surfaces of the magnetic particles (Japanese Patent Application Laid-Open (KOKAI) No. 1-298030).

Specifically, Japanese Patent Application Laid-Open (KOKAI) No. 1-298030 discloses "Magnetic particles in which fine zirconia particles or non-magnetic fine ferric oxide particles are present between the magnetic particle surfaces and an oxide Or hydroxide layer containing Al and/or Si and covering said particle surfaces" and "A process for producing magnetic particles which comprises preparing a mixed suspension containing magnetic particles and fine zirconia particles or non-magnetic fine ferric oxide particles and having a pH of not more than 4 or not less than 9, adding an acid or alkali solution thereto to adjust the pH to 6.5 to 8.5, thereby causing deposition of the said fine zirconia particles or non-magnetic fine ferric oxide particles on the surfaces of said magnetic particles, then adding an alkali solution to the suspension containing said magnetic particles having said fine zirconia particles or non-magnetic fine ferric oxide particles deposited thereon to prepare a suspension with a pH of not less than 10, adding an Al-containing compound and/or a Si-containing compound to said suspension, and further adding thereto an acid to adjust the pH to 6.5 to 8.5, thereby forming an oxide or hydroxide layer containing Al and/or Si on the surfaces of said magnetic particles having said fine zirconia particles or non-magnetic fine ferric oxide particles deposited thereon."

(5) The magnetite particles of various shapes produced by a wet process are compressed by using a wheel-type kneader or an attrition mill (Japanese Patent Application Laid-Open (KOKAI) Nos. 3-131863 and 3-131865).

As means for improving the properties of magnetic toner itself, the following methods are known:

(6) A mixture of hydrophobic magnetite particles and non-magnetic acicular metal oxide or hydrous iron oxide particles is dispersed in a resin (Japanese Patent Application Laid-Open (KOKAI) No. 2-97968).

(7) A mixture of magnetite particles, α-hematite particles and γ-hematite particles is dispersed in a resin (Japanese Patent Application Laid-Open (KOKAI) No. 63-178256).

The magnetic particles with a high fluidity, a low oil absorption, an excellent charging stability and a good initial dispersibility are most strongly required at present, but such magnetic particles are still unavailable.

The magnetic particles obtained from the above-described methods (1) and (3) are satisfactory in miscibility and dispersibility in resin, but are incapable of improving fluidity and charging stability to a satisfactory degree.

The magnetic particles obtained from the method (2) are indeed improved in fluidity, but their oil absorption is as high as not less than 22 cc/100 g, which indicates poor miscibility and dispersibility with resins.

The method (4) can not improve the initial dispersibility to a satisfactory degree.

The method (5), although effective for improving the miscibility and the dispersibility, is unable to improve a fluidity and a charging stability.

The method (6) is effective for stabilizing the charging amount of the toner when using hydrophobic magnetite, but this method does not improve the fluidity. In this method, the non-magnetic particles are simply mixed in a resin.

The method (7) is incapable of improving the fluidity.

Thus, it is strongly demanded to provide magnetic particles which has a high fluidity, a low oil absorptivity, an excellent charging stability and a good initial dispersibility.

On the other hand, hitherto, the iron oxide particles have been popularly used as a coloring pigment for coating materials, inks and resins by dispersing in vehicle or mixing with a resin, since the hematite ($\alpha$-$Fe_2O_3$) particles assume a reddish to dark purple color, the maghemite ($\gamma$-$Fe_2O_3$) particles assume a brown color and the magnetite ($FeO_x \cdot Fe_2O_3$, $x \leq 1$) particles assume a black color.

Recently, from the standpoint of an improvement of working efficiency aimed at energy saving and an improvement of coating properties, the request for better dispersibility of the iron oxide particles in vehicles in production of coating materials has become more and more strong.

In production of coating materials, the dispersibility of the pigment particles in the vehicle becomes a very important factor that governs working efficiency in the production process and decides the coating properties of the product.

This fact is referred to in the Bulletin of Japan Society of Color Materials, Vol. 49 No. 1 (1976), page 8, which states:

"It is not too much to say that most of the properties to be possessed by the coating films are decided by dispersibility of the pigment in the coating film. The theories teach that the good dispersibility of the pigment in the coating film makes the color tone vivid and improves the innate basic properties of the pigment such as tinting strength and hiding power. It also improves the luster of the coating film, the vividness, the mechanical properties, the impermeability to moisture, etc., which leads to improved durability of the coating film. It is thus understood that the dispersibility of the pigment in the coating film is an important factor that decides the properties of the coating film."

Observing the course of dispersion of the iron oxide particles in a vehicle or resin, it is noted that the particle dispersion process is diversified, and that the difference in manner of dispersion greatly affects the coating properties and the resin-surface characteristics even if the degree of finally reached dispersion is the same.

Oil absorption means the affinity of the iron oxide particles for linseed oil. The lower the oil absorption, the more improved is the finally reached dispersibility, which leads to improvement of the coating properties such as a tinting strength. However, in case where the initial dispersion is bad even if oil absorption is low, since the particle agglomerates are hard to break up, the iron oxide particles tend to remain as large agglomerates to the last to cause reduction of the tinting strength, etc., especially when a machine with weak dispersing force is used for preparation of the coating material or when the dispersing treatment time is short.

Thus, it is required to provide iron oxide particles having a low oil absorption and an excellent initial dispersibility. Improvement of the initial dispersibillty is also strongly desired from the standpoint of improvement of the working efficiency in answer to the recent requirement for energy saving.

Various techniques for coating the particle surfaces with organic or inorganic compounds have been proposed for improving the dispersibility of the iron oxide particles. For example, there have been disclosed the following methods: (i) A method of mixing ferric hydroxide or hydrous ferric oxide with a ferric oxide pigment (Japanese Patent Application Laid-Open (KOKAI) No. 51-124124); (ii) A method of adhering a higher fatty acid to the surface of a metal hydroxide deposited on the surface of inorganic pigment particles (Japanese Patent Application Laid-Open (KOKAI) No. 52-37930); (iii) A method of subjecting the surfaces of $\alpha$-$Fe_2O_3$ particles with ferric hydroxide to silane coupling-agent treatment (Japanese Patent Application Laid-Open (KOKAI) No. 55-94968).

As described above, the iron oxide particles with a low oil absorption and an excellent initial dispersibility are the most acutely required in the art, but any of the conventional iron oxide particles such as mentioned above can hardly be deemed as well satisfying the said property requirements.

According to the method (i) mentioned above, in which ferric hydroxide or hydrous ferric oxide is deposited as a layer in an amorphous state on the ferric oxide pigment particle surfaces, the oil absorption and initial dispersion are unsatisfactory as shown in the Comparative Examples.

The method (ii) mentioned above is intended to improve an affinity between the inorganic pigment particles and the higher fatty acid coated on their surfaces by depositing a metal hydroxide as a layer on the said inorganic pigment particle surfaces.

The method (iii) is also intended to improve an affinity between the pigment particles and the silane coupling agent coated on their surfaces by forming a layer of ferric hydroxide on the said pigment particle surfaces.

As seen from the above, it is strongly demanded to provide the iron oxide particles with a low oil absorption and an excellent initial dispersibility.

As a result of studies undertaken by the present inventors to overcome the foregoing problem of the related arts, it has been found that by reacting an aqueous ferrous salt solution and an aqueous alkali hydroxide solution of an amount of 0.90 to 0.99 equivalent to $Fe^{2+}$ in the said ferrous salt solution wherein a water-soluble silicate is previously added in an amount of 0.4 to 4.0 mol % (calculated as Si) based on Fe, to the said aqueous alkali hydroxide solution or the obtained ferrous salt reaction solution containing colloidal ferrous hydroxide, passing an oxygen-containing gas through the ferrous salt-reaction solution containing colloidal ferrous hydroxide at a temperature of 85° to 100° C. to carry out the oxidation reaction, thereby producing Si-containing magnetite particles, then adding an aqueous alkali hydroxide solution in an amount of not less than 1.00 equivalent to residual $Fe^{2+}$, to the suspension after completion of the oxidation reaction, further carrying out an oxidation reaction at 85° to 100° C. to produce the spherical magnetite particles containing silicon element, then adding a water-soluble aluminum salt to the residual silicate-containing alkaline suspension wherein the said spherical magnetite particles containing silicon element have been formed, so that the amount of said aluminum salt becomes 0.01 to 2.0 wt % (calculated as Al) based on the produced particles, then adjusting the pH of the solution to 5 to 9 to forms hydrous coprecipitate composed of silica and alumina on the surfaces of the said spherical magnetite particles containing silicon element, then filtering, washing with water and drying the precipitate, and if necessary subjecting the thus obtained dry particles to compaction, shearing and spatula-stroking by a wheel-type kneader or an attrition mill, the magnetic particles obtained have an excellent fluidity, and are low in oil absorption and also excellent in charging stability; or that by blending 0.1 to 12 parts by weight of non-magnetic fine iron oxide particles and/or non-magnetic fine hydrous iron oxide particles with 100 parts by weight of the iron oxide particles having an area-average diameter of 0.1 to 1.0 μm, and subjecting the blend to compaction, shearing and spatula-stroking by a wheel-type kneader or an attrition mill, the obtained iron oxide particles are low in oil absorption and have an excellent initial dispersibillty. The present invention has been achieved on the basis of these findings.

SUMMARY OF THE INVENTION

It is an object of the present invention to provide magnetic particles for magnetic toner having an excellent fluidity, a low oil absorption, a high charging stability and a good initial dispersibility, and a process for industrially producing such magnetic particles.

It is another object of the present invention to provide iron oxide particles having a low oil absorption and an excellent initial dispersibility, and suited for use as a coloring pigment for coating materials, inks and resins.

To accomplish the aim, in the first aspect of the present invention, there are provided magnetic particles comprising magnetite particles containing in the inside thereof silicon element in an amount of 0.10 to 1.00 wt % (calculated as Si), and a hydrous coprecipitate composed of silica and alumina and deposited or adhered on the said particle surfaces, and having an area-average diameter of the said magnetic particles of 0.05 to 1.0 μm.

In a second aspect of the present invention, there are provided magnetic particles for magnetic toner comprising spherical magnetite particles containing in the inside thereof silicon element in an amount of 0.10 to 1.00 wt % (calculated as Si), a hydrous coprecipitate composed of silica and alumina and adhered on the spherical magnetite particle surfaces and non-magnetic fine oxides particles and/or non-magnetic fine hydrous oxides particles composed of at least one element selected from the group consisting of Fe, Ti, Zr, Si and Al and adhered on the said hydrous coprecipitate in an amount of 0.1 to 10 wt % (calculated as the element), and having an area-average particle diameter of 0.05 to 0.5 μm.

In a third aspect of the present invention, there are iron oxide particles comprising granular iron oxide particles and non-magnetic fine iron oxide particles and/or non-magnetic fine hydrous iron oxide particles adhered on the surfaces of said granular iron oxide particles in an amount of 0.1 to 10 wt % based on said granular iron oxide particles.

In a fourth aspect of the present invention, there is a process for producing the magnetic particles, which comprises reacting an aqueous ferrous salt solution and an aqueous alkali hydroxide solution of an amount of 0.90 to 0.99 equivalent to $Fe^{2+}$ in said ferrous salt solution, a water-soluble silicate being previously added in an amount of 0.4 to 4.0 mol % (calculated as Si) based on Fe, to said aqueous alkali hydroxide solution or the produced ferrous salt reaction solution containing colloidal ferrous hydroxide; passing an oxygen-containing gas through said ferrous salt reaction solution containing colloidal ferrous hydroxide under heating at 85° to 100° C. to carry out an oxidation reaction, thereby producing magnetite particles containing silicon element from said colloidal ferrous hydroxide; adding an aqueous alkali hydroxide solution in an amount of not less than 1.00 equivalent to $Fe^{2+}$ remaining in the suspension after completion of the oxidation reaction; further conducting an oxidation reaction while heating at 85° to 100° C. to produce the spherical magnetite particles containing silicon element; then adding a water-soluble aluminum salt to the alkaline suspension containing residual silicate, in which said spherical magnetite particles containing silicon element have been produced, so that the amount of said water-soluble aluminum salt added is 0.01 to 2.0 wt % (calculated as Al) based on the produced particles; and then adjusting the pH of the suspension to 5 to 9, thereby causing said residual silicate and said added Al to deposit as a hydrous coprecipitate of silica and alumina on the surfaces of said spherical magnetite particles containing silicon element.

In a fifth aspect of the present invention, there is a process for producing the magnetic particles, which comprises reacting an aqueous ferrous salt solution and an aqueous alkali hydroxide solution of an amount of 0.90 to 0.99 equivalent to $Fe^{2+}$ in said ferrous salt solution, a water-soluble silicate being previously added in an amount of 0.4 to 4.0 mol % (calculated as Si) based on Fe, to said aqueous alkali hydroxide solution or the produced ferrous salt reaction solution containing colloidal ferrous hydroxide; passing an oxygen-containing gas through said ferrous salt reaction solution containing colloidal ferrous hydroxide under heating at 85° to 100° C. to carry out an oxidation reaction, thereby producing magnetite particles containing silicon element from said colloidal ferrous hydroxide; adding an aqueous alkali hydroxide solution in an amount of not less than 1.00 equivalent to $Fe^{2+}$ remaining in the suspension after completion of the oxidation reaction; further conducting an oxidation reaction while heating at 85° to 100° C. to produce the spherical magnetite particles containing silicon element; then adding a water-soluble aluminum salt to the alkaline suspension containing residual silicate, in which said spherical magnetite particles containing silicon element have been produced, so that the amount of said water-soluble aluminum salt added is 0.01 to 2.0 wt % (calculated as Al) based on the produced particles; then adjusting the pH of the suspension to 5 to 9, thereby causing said residual silicate and said added Al to deposit as a hydrous coprecipitate of silica and alumina on the surfaces of said spherical magnetite particles containing silicon element; then filtering out the produced particles; washing with water and drying; and subjecting the obtained dry particles to compaction, shearing and spatula-stroking by using a wheel-type kneader or an attrition mill.

In a sixth aspect of the present invention, there is a process for producing the magnetic particles, which comprises reacting an aqueous ferrous salt solution and an aqueous alkali hydroxide solution of an amount of 0.90 to 0.99 equivalent to $Fe^{2+}$ in said ferrous salt solution, a water-soluble silicate being previously added in an amount of 0.4 to 4.0 mol % (calculated as Si) based on Fe, to said aqueous alkali hydroxide solution or the produced ferrous salt reaction solution containing colloidal ferrous hydroxide; passing an oxygen-containing gas through said ferrous salt reaction solution containing colloidal ferrous hydroxide under heating at 85° to 100° C. to carry out an oxidation reaction, thereby producing magnetite particles containing silicon element from said colloidal ferrous hydroxide; adding an aqueous alkali hydroxide solution in an amount of not less than 1.00 equivalent to $Fe^{2+}$ remaining in the suspension after completion of the oxidation reaction; further conducting an oxidation reaction while heating at 85° to 100° C. to produce the spherical magnetite particles containing silicon element; then adding a water-soluble aluminum salt to the alkaline suspension containing residual silicate, in which said spherical magnetite particles containing silicon element have been produced, so that the amount of said water-soluble aluminum salt added is 0.01 to 2.0 wt % (calculated as Al) based on the produced particles; and then adjusting the pH of the suspension to 5 to 9, thereby causing said residual silicate and said added Al to deposit as a hydrous coprecipitate of silica and alumina on the surfaces of said spherical magnetite particles containing silicon element; adding non-magnetic fine oxides particles and/or non-magnetic fine hydrous oxides particles composed of at least one element selected from the group consisting of Fe, Ti, Zr, Si and Al in an amount of 0.1 to 25 parts by weight to 100 parts by weight of the obtained spherical magnetite particles having an area-average diameter of 0.05 to 0.5 μm; and subjecting the obtained mixture to compaction, shearing and spatula-stroking by using a wheel-type kneader or an attrition mill, so that non-magnetic fine oxides particles and/or non-magnetic fine hydrous oxides particles are adhered on said silica-alumina hydrous coprecipitate.

In a seventh aspect of the present invention, there is a process for producing the magnetic particles, which comprises reacting an aqueous ferrous salt solution and an aqueous alkali hydroxide solution of an amount of 0.90 to 0.99 equivalent to $Fe^{2+}$ in said ferrous salt solution, a water-soluble silicate being previously added in an amount of 0.4 to 4.0 mol % (calculated as Si) based on Fe, to said aqueous alkali hydroxide solution or the produced ferrous salt reaction solution containing colloidal ferrous hydroxide; passing an oxygen-containing gas through said ferrous salt reaction solution containing colloidal ferrous hydroxide under heating at 85° to 100° C. to carry out an oxidation reaction, thereby producing magnetite particles containing silicon element from said colloidal ferrous hydroxide; adding an aqueous alkali hydroxide solution in an amount of not less than 1.00 equivalent to $Fe^{2+}$ remaining in the suspension after completion of the oxidation reaction; further conducting an oxidation reaction while heating at 85° to 100° C. to produce the spherical magnetite particles containing silicon element; then adding a water-soluble aluminum salt to the alkaline suspension containing residual silicate, in which said spherical magnetite particles containing silicon element have been produced, so that the amount of said water-soluble aluminum salt added is 0.01 to 2.0 wt % (calculated as Al) based on the produced particles; and then adjusting the pH of the suspension to 5 to 9, thereby causing said residual silicate and said added Al to deposit as a hydrous coprecipitate of silica and alumina on the surfaces of said spherical magnetite particles containing silicon element; then filtering out the produced particles; washing with water and drying; subjecting the obtained dry particles to compaction, shearing and spatula-stroking by using a wheel-type kneader or an attrition mill, adding non-magnetic fine oxides particles and/or non-magnetic fine hydrous oxides particles composed of at least one element selected from the group consisting of Fe, Ti, Zr, Si and Al in an amount of 0.1 to 25 parts by weight to 100 parts by weight of the obtained spherical magnetite particles having an area-average diameter of 0.05 to 0.5 μm; and subjecting the obtained mixture to compaction, shearing and spatula-stroking by using a wheel-type kneader or an attrition mill, so that non-magnetic fine oxides particles and/or non-magnetic fine hydrous oxides particles are adhered on said silica-alumina hydrous coprecipitate.

In a eighth aspect of the present invention, there is a process for producing the iron oxide particles, which comprising adding non-magnetic fine iron oxide particles and/or non-magnetic fine hydrous iron oxide particles in an amount of 0.1 to 12 parts by weight to 100 parts by weight of the granular iron oxide particles having an area-average diameter of 0.1 to 1.0 μm; and subjecting the obtained mixture to compaction, shearing and spatula-stroking by using a wheel-type kneader or an attrition mill.

DETAILED DESCRIPTION OF THE INVENTION

The magnetic particles according to the present invention contains in the inside thereof silicon element in an amount of 0.10 to 1.00 wt % (calculated as Si). When the content of silicon element is less than 0.10 wt %, the adhesive force of the hydrous coprecipitate composed of silica and alumina to the spherical magnetite particle surfaces is reduced. When the content thereof exceeds 1.00 wt %, the magnetic-stability of the spherical magnetite particles lowers to cause distribution of coercive force and residual magnetization. The preferred range of the silicon content is 0.20 to 0.90 wt % (calculated as Si).

In the hydrous coprecipitate of silica and alumina deposited or adhered on the magnetic particle surfaces in the present invention, the silica content is 0.01 to 0.5 wt % (calculated as Si) based on the final product (magnetic particles) and the alumina content is 0.01 to 2.0 wt % (calculated as Al) based on the final product (magnetic particles). It is preferred that the total amount of silica and alumina in the hydrous coprecipitate is in the range of 0.02 to 2.5 wt % (calculated as Si and Al). When the silica content in the hydrous coprecipitate is less than 0.01 wt % (calculated as Si), it is difficult to improve the fluidity and also the charging stability may be deteriorated. When the silica content exceeds 0.5 wt % (calculated as Si), although it is possible to improve the fluidity, the charging stability and the environmental stability may be deteriorated. When the alumina content is less than 0.01 wt % (calculated as Al), it is difficult to improve the charging stability, and when the alumina content exceeds 2.0 wt % (calculated as Al), the environmental stability may be deteriorated. The more preferred range of the silica content in the hydrous coprecipitate is 0.01 to 0.3 wt % (calculated as Si) based on the final product (magnetic particles), more preferred range of the alumina content in the hydrous coprecipitate is 0.02 to 1.5 wt % (calculated as Al) based on the final product (magnetic particles), and more preferred range of the total amount of silica and alumina in the hydrous coprecipitate is 0.03 to 1.8 wt % (calculated as Si and Al) based on the final product (magnetic particles).

The silica to alumina ratio in the said hydrous coprecipitate, in view of a fluidity, an oil absorption and a charging stability, is preferably in the range of 10:1 no 1:100, more preferably 2:1 to 1:100, still more preferably 1:1 to 1:70 (expressed as molar ratio of Si to Al).

The size of the magnetic particles according to the present invention is 0.05 to 1.0 μm (expressed as area-average particle diameter). When the particle size is less than 0.05 μm, it becomes difficult to mix and disperse the magnetite particles in resins. When the particle size exceeds 1.0 μm, although the particles are easily mixed and dispersed in resins, the magnetite particles become liable to release from the magnetic toner surface. The preferred range of the particle size is 0.05 to 0.5 μm, more preferably 0.07 to 0.4 μm (expressed as area-average particle diameter).

The spherical magnetite particles before subjected to compaction treatment according to the present invention have deposited (attached) on their surfaces the hydrous coprecipitate composed of silica and alumina (hereinafter referred to as "silica-alumina hydrous coprecipitate"). The adhesion strength as determined in the manner described later, is around 90 to 100.

The spherical magnetite particles after subjected to compaction treatment have the silica-alumina hydrous coprecipitate pressed to the particle surfaces so that the said hydrous coprecipitate is more strongly attached (hereinafter referred to as "adhered") to the particle surfaces. The adhesion strength is around 95 to 100.

The non-magnetic fine oxides particles and/or non-magnetic fine hydrous oxides particles composed of an element selected from the group consisting of Fe, Ti, Zr, Si and Al, and adhering to the silica-alumina hydrous coprecipitate on the magnetic particle surfaces (hereinafter referred to as "non-magnetic fine oxides and/or hydrous oxides particles") include, for instance, non-magnetic fine oxides particles such as granular, acicular (columnar), spindle, or plate-like (lameliar) hematite ($\alpha$-$Fe_2O_3$) fine particles, granular or columnar $TiO_2$ fine particles, granular $ZrO_2$ fine particles, granular $SiO_2$ fine particles and granular or acicular $Al_2O_3$ fine particles; and non-magnetic fine hydrous oxides particles such as granular, acicular (columnar), spindle, or plate-like (lameliar) hydrous ferric oxide fine particles such as goethite, lepidocrosite and akageneite fine particles, hydrous-aluminum oxide fine particles such as AlOOH fine particles, and hydrous titanium oxide fine particles such as $TiOOH_2$ fine particles.

The size of the said non-magnetic fine oxides and hydrous oxides particles is 0.01 to 0.1 μm. When the particle size is less than 0.01 μm or exceeds 0.1 μm, the initial dispersibility tends to deteriorate. Considering the initial dispersibility, the particle size is preferably in the range of 0.02 to 0.06 μm.

The size of the non-magnetic fine oxides and hydrous oxides particles of a specific element adhering to the silica-alumina hydrous coprecipitate on the magnetic particle surfaces according to the present invention is preferably the one which satisfies the following formulae (1) to (4):

$$1/100 \leq b/a \leq 1/3 \quad (1)$$

$$1/100 \leq c/a \leq 1 \quad (2)$$

$$1/100 \leq d/a \leq 1/3 \quad (3)$$

$$1/100 \leq d/c < 1 \quad (4)$$

more preferably one which satisfies the following formulae (5) to (8):

$$1/50 \leq b/a \leq 1/3 \quad (5)$$

$$1/50 \leq c/a \leq 1/2 \quad (6)$$

$$1/50 \leq d/a \leq 1/3 \quad (7)$$

$$1/10 \leq d/c < 1 \quad (8)$$

wherein a is an average particle diameter of the spherical magnetite particles as core particles, b is an average particle diameter of the granular non-magnetic fine oxides and/or hydrous oxides particles in case of granular, c is an average major axial diameter or average plate-surface diameter of the non-magnetic fine oxides and/or hydrous oxides particles in case of acicular (columnar), spindle or plate-like, and d is an average minor axial diameter or lamellar thickness of the non-magnetic fine oxides and hydrous oxides particles in case of acicular (columnar), spindle or plate-like.

When the b/a ratio is less than 1/100, it is difficult to improve a dispersibility of the magnetic particles, and when the b/a ratio exceeds 1/3, it is difficult to adhere the non-magnetic fine oxides and/or hydrous oxides particles to the magnetite particle surfaces.

When the c/a ratio is less than 1/100, it is difficult to improve a dispersibility of the magnetic particles, and when the c/a ratio exceeds 1, it is difficult to adhere the non-magnetic fine oxides and/or hydrous oxides particles to the magnetite particle surfaces.

When the d/a ratio is less than 1/100, it is difficult to improve a dispersibility of the magnetic particles, and when the b/a ratio exceeds 1/3, it is difficult to adhere the non-magnetic fine oxides and/or hydrous oxides particles to the magnetite particle surfaces.

When the d/c ratio is less than 1/100, the non-magnetic fine oxides and/or hydrous Oxides particles tend to break during the adhering-treatment and the produced powder can contribute deterioration of dispersibility.

The amount of the non-magnetic fine oxides and/or hydrous oxides particles of a specific element adhering to the silica-alumina hydrous coprecipitate on the magnetite particle surfaces according to the present invention is 0.1 to 10 wt % based on the final particles. When the amount of the said non-magnetic fine oxides and/or hydrous oxides particles is less than 0.1 wt % or exceeds 10 wt %, the initial dispersibility may be deteriorated. Further, when said amount of the said non-magnetic fine oxides and/or hydrous oxides particles exceeds 10 wt %, the magnetization lowers to deteriorate image quality. Considering the initial dispersibility, the said amount is preferably 0.5 to 10 wt %, more preferably 0.5 to 5.0 wt %.

The iron oxide particles for pigments of another aspect of the present invention are described below.

The average particle size of the iron oxide particles according to the present invention is 0.1 to 1.0 µm (expressed as area-average diameter). When the average particle size is less than 0.1 µm, it is difficult to obtain a uniform dispersion in the preparation of a coating material or during mixing with a resin. The tinting strength of the particles also lowers. When the average particle size exceeds 1.0 µm, the smoothness of the coating film is deteriorated and the tinting strength of the particles lowers. In view of the tinting strength, the average particle size is preferably in the range of 0.1 to 0.8 µm (expressed as area-average diameter).

The amount of the non-magnetic fine iron oxide particles and/or non-magnetic fine hydrous iron oxide particles (hereinafter referred to as "non-magnetic fine iron oxide and/or hydrous iron oxide particles") adhering to the surfaces of the iron oxide particles according to the present invention is 0.1 to 10 wt % based on the final particles. When the said amount of the non-magnetic fine iron oxide and/or hydrous iron oxide particles is less than 0.1 wt %, it is difficult to improve an initial dispersibility of the granular iron oxide particles as core particles. When the amount of the non-magnetic fine iron oxide and/or hydrous iron oxide particles exceeds 10 wt %, the non-magnetic fine iron oxide and/or hydrous iron oxide particles which do not adhere to the granular iron oxide particle surfaces harm to dispersion of the said granular iron oxide particles.

The non-magnetic fine iron oxide particles usable in the present invention include granular or acicular hematite ($\alpha$-$Fe_2O_3$) fine particles, and the non-magnetic fine hydrous iron oxide particles include goethite, lepidocrosite and akageneite fine particles of various shapes such as granular, acicular, spindle and plate-like. The average particle size of these non-magnetic fine iron oxide or hydrous iron oxide particles is preferably 0.01 to 0.1 µm, more preferably 0.02 to 0.08 µm.

The particle size of the said non-magnetic fine iron oxide or hydrous iron oxide particles is preferably the one which satisfies the afore-mentioned formulae (1) to (4), more preferably the formulae (5) to (8), wherein a is an average particle diameter of the granular iron oxide particles, b is an average particle diameter of the non-magnetic fine iron oxide or hydrous iron oxide particles in case of granular, c is an average major axis and d is an average minor axis of the said particles in case of acicular (columnar), spindle or plate-like.

When the b/a ratio is less than 1/100, it is difficult to improve a dispersibility and an initial dispersibility of the granular iron oxide particles to be treated, and when the b/a ratio exceeds 1/3, it is difficult to adhere the non-magnetic fine iron oxide and/or hydrous iron oxide particles to the granular iron oxide particles.

When the c/a ratio is less than 1/100, it is difficult to improve a dispersibility and an initial dispersibility of the granular iron oxide particles, and when the c/a ratio exceeds 1, it is difficult to adhere the non-magnetic fine iron oxide and/or hydrous iron oxide particles to the granular iron oxide particles.

When the d/a ratio is less than 1/100, it is difficult to improve a dispersibility and an initial dispersibility of the said granular iron oxide particles, and when the d/a ratio exceeds 1/3, it is difficult to adhere the non-magnetic fine iron oxide and/or hydrous iron oxide particles to the granular iron oxide particles.

When the d/c ratio is less than 1/100, the non-magnetic fine particles of iron oxide or hydrous iron oxide tend to break during the adhering-treatment to form fine powder which can contribute deterioration of dispersibility.

The iron oxide particles according to the present invention have the non-magnetic fine iron oxide and/or hydrous iron oxide particles pressed to the surfaces and strongly adhered thereto. The adhesion strength is around 50 to 100, preferably 60 to 100.

A process for producing the magnetic particles according to the present invention is described below.

The spherical magnetite particles used in the present invention are particles represented by the formula: $FeO_x \cdot Fe_2O_3$ ($0 < x \leq 1$), particles containing in the inside thereof a silicon element and assuming a black color. These particles may also contain Al, Zn, Pin, Mg and/or other elements which are usually added for improving the specified properties of the produced magnetic particles for magnetic toner, in an amount of approximately 0.01 to 1.0 wt %, preferably 0.1 to 1.0 wt %.

The "spherical particles" referred to herein are particles specified by a sphericity factor of not less than 0.75, preferably 0.8 to 1.0, the sphericity factor being determined by calculating respectively the average minimal diameter and the average maximal diameter from the measured maximum diameter and minimal diameter of not less than 200 pieces of the magnetite particles shown in a transmission electron micrograph, and then dividing the average minimal diameter by the average maximal diameter.

The magnetic particles (spherical magnetite particles) of the present invention containing a silicon element in the inside thereof and having a hydrous coprecipitate of silica and alumina deposited or adhered on their surfaces can be obtained from a process comprising the steps of: reacting an aqueous ferrous salt solution and an aqueous alkali hydroxide solution of an amount of 0.90 to 0.99 equivalent to $Fe_2+$ in the said ferrous salt solution, a water-soluble silicate being previously added in an amount of 0.4 to 4.0 mol % (calculated as Si) based on Fe, to the said aqueous alkali hydroxide solution or the produced ferrous salt reaction solution containing colloidal ferrous hydroxide; passing an oxygen-containing gas through the said ferrous salt reaction solution containing colloidal ferrous hydroxide under heating at 85° to 100° C. to conduct an oxidation reaction, thereby producing magnetite particles containing silicon element from the said colloidal ferrous-hydroxide; then adding an aqueous alkali hydroxide solution of an amount of not less than 1.00 equivalent to $Fe^{2+}$ remaining in the suspension after completion of the oxidation reaction; further conducting an oxidation reaction under heating at 85° to 100° C. to produce spherical magnetite particles containing silicon element; adding a water-soluble aluminum-salt to the Si-containing alkaline suspension in which the said spherical magnetite particles containing silicon element have been produced, so that the content of the said water-soluble aluminum salt becomes 0.01 to 2.0 wt % (calculated as Al) based on the produced particles; adjusting the pH of the suspension to 5 to 9, thereby causing the said residual silicate and the said added Al to deposit or adhere as a hydrous coprecipitate composed of silica and alumina on the surfaces of the said spherical magnetite particles containing silicon element; then filtering, washing with water and drying the resulting product (magnetic particles); and if necessary subjecting the dried particles to compaction, shearing and spatula-stroking by using a wheel-type kneader or an attrition mill, In the process of the present invention, as the aqueous ferrous salt solution, there can be used an aqueous ferrous sulfate solution, an aqueous ferrous chloride solution and the like.

As the aqueous alkali hydroxide solution, there can be used an aqueous solution of a hydroxide of an alkali metal such as sodium hydroxide, potassium hydroxide, etc., or an alkaline earth metal ouch as magnesium hydroxide, calcium hydroxide, etc.

The amount of the aqueous alkali hydroxide solution used for causing precipitation of colloidal ferrous hydroxide is 0.90 to 0.99 equivalent to $Fe^{2+}$ in the aqueous ferrous salt solution. When the amount of the aqueous alkali hydroxide solution is less than 0.90 equivalent, the acicular hydrous iron oxide particles tend to form as by-products. When the amount of the aqueous alkali hydroxide solution exceeds 0.99 equivalent, it is difficult to produce the spherical magnetite particles.

The oxidation reaction temperature in the present invention is 85° to 100° C. When the reaction temperature is less than 85° C., the acicular hydrous iron oxide particles other than the desired spherical magnetite particles tend to produce as by-products. When the reaction temperature is higher than 100° C., although the spherical magnetite particles can be produced, the process is industrially. impractical.

Oxidation is effected by passing an oxygen-containing gas (such as air) through the solution.

As the water-soluble silicate, there can be used the silicates of sodium, potassium, etc.

The amount of the water-soluble silicate added is 0.4 to 4.0 mol %, preferably 0.4 to 3.5 mol % (calculated as Si) based on Fe. When the amount of the water-soluble silicate is less than 0.4 mol %, it is difficult to cause coprecipitation of silica and alumina on the particle surfaces because of the insufficient amount of Si remaining in the alkaline suspension after production of the spherical magnetite particles-containing silicon element. When the amount of the water-soluble silicate exceeds 4.0 mol %, the obtained spherical magnetite particles are poor in environmental stability.

In the process of the present invention, the amount of Si remaining in the alkaline suspension is not less than 0.01 wt %, preferably 0.02 to 0.4 wt % (calculated as Si), based on the final product.

In the present invention, a water-soluble silicate is used for incorporating a silicon element in the spherical magnetite particles. Addition of the water-soluble silicate also contributes to improvement of the shape (spherical) of the produced particles. Concerning the time of addition of the water-soluble silicate, it is necessary to precede the production of the magnetite particles by passing of an oxygen-containing gas through the ferrous salt reaction solution containing colloidal ferrous hydroxides. The water-soluble silicate my be added either to the aqueous alkali hydroxide solution or to the ferrous salt reaction solution containing colloidal ferrous hydroxide.

When the water-soluble silicate is added to the ferrous salt solution, the silicate is precipitated as $SiO_2$ immediately after addition of the water-soluble silicate, so that it is impossible to uniformly contain silicon element in the inside of the spherical magnetite particles and the object of the present invention can not be attained.

The amount of the aqueous alkali hydroxide solution used in the present invention is not less than 1.00 equivalent to residual $Fe^{2+}$. When the amount of the aqueous alkali hydroxide solution is less than 1.00 equivalent, all of $Fe^{2+}$ is not precipitated. In view of the industrialization, the amount of 1.00 to 2.00 equivalent to the residual $Fe^{2+}$ is preferred.

The temperature of the alkaline suspension at the time of addition of the water-soluble aluminum salt thereto is 50° to 100° C. When the said temperature of the alkaline suspension is less than 50° C., the magnetite particles are not well dispersed in the suspension, hindering uniform coprecipitation of silica and alumina. When the temperature of the said alkaline solution is higher than 100° C., although it is possible to maintain uniform dispersion of the spherical magnetite particles in the suspension, the process is not economical.

Oxidation is effected by passing an oxygen-containing gas (such as air) through the solution.

As the water soluble aluminum salt used in the present invention, aluminum sulfate, aluminum nitrate and aluminum chloride can be exemplified.

The amount of the water-soluble aluminum salt used in the process of the present invention is 0.01 to 2.0 wt %, preferably 0.01 to 1.5 wt % (calculated as Al) based on the produced particle. When the said amount of the water-soluble aluminum salt is less than 0.01 wt %, it is difficult to precipitate an enough amount of Al to impart a desired improvement of charging stability. When the said amount of the water-soluble aluminum salt exceeds 2.0 wt %, an excessive amount of Al is deposited (attached) on the magnetite particles, thereby reducing their environmental stability. Considering the environmental stability of the produced particles, the amount of the said water-soluble aluminum salt to be added is preferably 0.01 to 1.5 wt %.

In the process of the present invention, the pH of the alkaline suspension after addition of the water-soluble aluminum salt is adjusted to 5 to 9. When the pH value of the alkaline suspension is less than 5 or greater than 9, the silica-alumina hydrous coprecipitate can not be readily deposited (attached) on the magnetite particle surfaces.

A wheel-type kneader or an attrition mill can be used for the compaction of the magnetite particles having the silica-alumina hydrous coprecipitate deposited on the surfaces. The wheel-type kneaders usable in the present invention include Simpson mix muller, multimill, Stotz mill, back flow mixer, Irich mill, etc. Wet pan mill, melanger, whirl mill and quick mill can not be used in the present invention since they merely have the functions of compaction and spatula-stroking, and no shearing action.

Deposition (attachment) of the non-magnetic fine oxides and/or hydrous oxides particles composed of a specific element in the present invention can be accomplished by adding and mixing the non-magnetic fine oxides and/or hydrous oxides particles in the suspension containing magnetic particles (spherical magnetite particles) after having the silica-alumina hydrous coprecipitate deposited (attached) on the spherical magnetite particle surfaces, and then subjecting the suspension to filtration, water-washing and drying; or by adding the non-magnetic fine oxides and/or hydrous oxides particles to the magnetic particles (spherical magnetite particles) containing a silicon element in the inside thereof and having the silica-alumina hydrous coprecipitate on the surfaces, which have been obtained after filtration, water-washing and drying; and then subjecting the said particles to dry-mixing.

The amount of the non-magnetic fine oxides and/or hydrous oxides particles composed of a specific element is not more than 12 parts by weight, preferably 0.1 to 12 parts by weight, more preferably 0.1 to 10 parts by weight based on 100 parts by weight of the particles to be treated. When the said amount is less than 0.1 part by weight, the, obtained particles may show no significant improvement of the fluidity. When the said amount exceeds 12 parts by weight, the magnetization of the particles lowers to deteriorate the image quality.

Adhering-treatment according to the present invention can be conducted, for example, by compressing, shearing and spatula-stroking the magnetic particles (spherical magnetic particles) containing silicon in the inside and having the silica-alumina hydrous coprecipitate deposited on the surfaces, and the non-magnetic fine oxides and/or hydrous oxides particles of a specific element by using a wheel-type kneader or an attrition mill.

As the wheel-type kneader, there can be used Simpson mix muller, multimill, back flow mixer, Irich mill, etc., but wet pan mill, melanger, whirl mill and quick mill are inapplicable since they merely perform compaction and spatula-stroking and no shearing work.

In case of using a wheel-type kneader for the said adhering-treatment, the linear load is preferably in the range of 10 to 200 kg/cm. When the linear load Is less Khan 10 kg/cm, it is difficult to adhere the non-magnetic fine oxides and/or hydrous oxides particles to the magnetic particles. When the linear load is greater than 200 kg/cm, the particles may be broken. The more preferred range of the linear load is 20 to 150 kg/cm.

In case the said adhering-treatment is carried out by using a wheel-type kneader, the treating time is 10 to 120 minutes. When the treating time is less than 10 minutes, it is difficult to adhere the non-magnetic fine oxides and/or hydrous oxides particles to the magnetic particles. When the treating time exceeds 120 minutes, it is unfavorable in terms of economy although the desired adhering-treatment can be accomplished. The more preferred range of treating time is 20 to 90 minutes.

A process for producing the iron oxide particles of another aspect of the present invention is described below.

As the granular iron oxide particles to be treated in the present invention, there can be used hematite ($\alpha$-$Fe_2O_3$) particles, magnetite ($FeO_x \cdot Fe_2O_3$, $0<x\leq 1$) particles and maghemite ($\gamma$-$Fe_2O_3$) particles. These particles may contain metal elements other than Fe, such as Co, Ni, Zn, Ti, Mn, Al, Si and/or Mg.

The shape of these iron oxide particles is granular. The "granular particles" mean particles having the substantially spherical, spherical or isotropic shapes such as polyhedral, hexahedral and octahedral.

The granular magnetite particles to be treated in the present invention can be obtained by, for example, a wet oxidation method in which an oxygen-containing gas is passed through a suspension containing ferrous hydroxide prepared by using an aqueous ferrous salt solution and an aqueous alkali solution, and a method in which the hematite particles or hydrous iron oxide particles and ferrous hydroxide are heated at not less than 60° C. at a pH of not less than 8.

The granular hematite particles can be obtained by, for example, a method in which said granular magnetite particles are oxidized by heating at 500° to 900° C., preferably 550° to 900° C. in the air.

The maghemite particles can be obtained by, for example, a method in which the said magnetite particles are oxidized by heating at 200° to 500° C., preferably 250° to 500° C. in the air.

The amount of the non-magnetic fine iron oxide and/or hydrous iron oxide particles is 0.1 to 12 parts by weight based on 100 parts by weight of the granular iron oxide particles. When the amount of the said non-magnetic fine iron oxide and/or hydrous iron oxide particles is less than 0.1 part by weight or greater than 12 parts by weight, the obtained it on oxide particles are scarcely improved in dispersibility.

For adhering the non-magnetic fine iron oxide and/or hydrous iron oxide particles to the granular iron oxide particle surfaces in the present invention, the said granular iron oxide particles and the said non-magnetic fine iron oxide and/or hydrous iron oxide particles are subjected to compaction, shearing and spatula-stroking by using a wheel-type kneader or an attrition mill as described above.

One of the most important points of the present invention is the fact that by adding a water-soluble aluminum salt to an alkaline suspension containing residual silicate, in which the spherical magnetite particles containing silicon element have been produced, and adjusting the pH of the solution to 5 to 9, there can be obtained the spherical magnetite particles containing in the inside thereof silicon element in an amount of 0.10 to 1.00 wt % (calculated as Si) and also having a hydrous coprecipitate of silica and alumina deposited on their surfaces and having an area-average diameter of 0.05 to 0.5 µm; and these spherical magnetite particles have a high fluidity, a low oil absorption and an excellent charging stability, and the fact that when the non-magnetic fine oxides and/or hydrous oxides particles of a specific element are further adhered to the said silica-alumina hydrous coprecipitate, the obtained particles are improved in initial dispersibility while maintaining said properties such as a high fluidity, a low oil absorption and an excellent charging stability.

The present inventors consider that these specificities may be attributed to the following fact.

Since the spherical magnetite particles according to the present invention have a low oil absorption as shown in the Examples and the Comparative Examples described later, these particles have little tendency to agglomerate each other and therefore, their surfaces can be wetted sufficiently with a small amount of linseed oil. This accounts for an excellent dispersibility of the particles of the present invention.

Regarding the reason why the magnetic particles according to the present invention have little tendency to agglomerate each other, the present inventors refer to the following facts. Since the hydrous coprecipitate composed of silica and alumina is produced in a solution, such hydrous coprecipitate is fine and uniform in particle size, and also it has good adaptability to the magnetic particles since silicon element is contained in the inside of the spherical magnetite particles. Further, since the hydrous coprecipitate contains aluminum element which has a higher affinity for Fe than silicon element, the said hydrous coprecipitate tends to deposit on the magnetite particle surfaces, and as a result, the fine and uniform silica-alumina hydrous coprecipitate particles are evenly distributed on the surfaces of the individual magnetic particles existing independently of each other in the solution. For this reason probably, the magnetic particles of the present invention have little tendency to agglomerate each other even after subjected to such treatments as filtration, washing with water and drying.

Excellent fluidity of the spherical magnetite particles according to the present invention may be accounted for by the fact that since a large number of the fine and uniform silica-alumina hydrous coprecipitate particles are uniformly distributed on the magnetite particle surfaces as mentioned above, there is provided a sufficient unevenness of the particle surface and also the individual magnetite particles are sufficiently spaced apart from each other to discourage magnetic agglomeration of the particles.

Excellent charging stability of the spherical magnetite particles according to the present invention may be ascribed to the fact that since a large number of the fine and uniform silica-alumina hydrous coprecipitate particles are evenly distributed on the magnetite particle surfaces as mentioned above, the negative charges of silicon element and the positive charges of aluminum element disposed between the silicon elements counteract each other to even off the charges of both polarities.

As regards an excellent initial dispersibility imparted to the spherical magnetite particles of the present invention while maintaining the above-mentioned characteristics, the present inventors consider that as noted from a scanning electron micrographical observation, the non-magnetic fine oxides and/or hydrous oxides particles are particles whose the minimal diameter is greater than the height of the convexities of unevenness formed by the silica-alumina hydrous coprecipitate and which also have an affinity for the said hydrous coprecipitate, and further the said non-magnetic fine oxides and/or hydrous oxides particles are adhered to the silica-alumina hydrous coprecipitate on the spherical magnetite particles in a smaller amount than required for entirely covering the surfaces of the spherical magnetite particles having the silica-alumina hydrous coprecipitate, so that the said non-magnetic fine oxides and/or hydrous oxides particles are strongly adhered to the silica-alumina hydrous coprecipitate of the magnetite particle, with the individual non-magnetic fine oxides and/or hydrous oxides particles being properly spaced apart from each other and smashing down the convexities of unevenness formed by the silica-alumina hydrous coprecipitate, with the lower portions of the said non-magnetic fine oxides and/or hydrous oxides particles in the thickness direction being embedded in the silica alumina hydrous coprecipitate of the magnetic particles. Consequently, the portions of the spherical magnetite particle surfaces where unevenness formed by the hydrous coprecipitate is maintained contributes to the improvement of the properties such as a fluidity, an oil absorption and a charging stability. On the other hand, since the height of the non-magnetic fine oxides and/or hydrous oxides particles at the portions of the spherical magnetite particles where the non-magnetic fine oxides and/or hydrous oxides particles are adhered, is greater than that of the convexities of unevenness formed by the hydrous coprecipitate, the individual spherical magnetite particles can be spaced apart wider from each other and the magnetic agglomerative tendency of the particles is further weakened, resulting in a reduced Van der Waals force.

The granular magnetite particles before compaction treatment according to the present invention have a compaction degree of not more than 60%, an oil absorption of not more than 20 ml/100 g, a charging stability of not more than 1.0 µc/g, a charging amount of not less than −50 µc/g, an initial dispersibility of not more than 1.3, a bulk density of 0.4 to 1.0 g/cc and a tap density of 0.6 to 1.5 g/cc.

Concerning a reason why the fluidity is enhanced and the oil absorption is reduced after the compaction treatment according to the present invention, the present inventors consider that not only the silica-alumina hydrous coprecipitate particles which are deposited (attached) on the magnetite particle surfaces but also the silica-alumina hydrous coprecipitate particles which are merely held between the magnetite particles, are equally pressed against the magnetite particle surfaces in the compaction treatment, thereby causing a greater number of the hydrous coprecipitate particles to be more adhered to the magnetite particle surfaces and to be kept from releasing, so that the effects of the said silica-alumina hydrous coprecipitate-are fully exhibited.

Further, regarding the reason why the charging stability of the magnetite particles is improved after compaction treatment according to the present invention, the present inventors consider that the silica-alumina hydrous coprecipitate particles held between the magnetite particles are also forced to adhere to the magnetite particle surfaces by compaction treatment to promote leveling of charges.

The spherical magnetite particles having the said non-magnetic fine oxides and/or hydrous oxides particles deposited on the silica-alumina hydrous coprecipitate according to the present invention have a compaction degree of not more than 40%, an oil absorption of not more than 18 ml/100 g, a charging stability of not more than 0.8 μC/g, and an initial dispersion of not lets than 1.4. Also, the said spherical magnetite particles according to the present invention have an adhesive strength of not less than 50, a magnetization of not less than 75 emu/g, a residual magnetization of not less than 2.0 emu/g, a bulk density of 0.8 to 1.3 g/cc, a tap density is 1.0 to 1.8 g/cc, and a charging amount of not less than −50 μc/g.

The magnetic particles of the present invention are useful for magnetic toner.

Magnetic toner produced from the magnetic particles of the present invention is obtained by mixing the particles with a resin.

The resin used in the present invention is not restricted, and known binder resins for magnetic toner are usable. Examples of such resins are styrene-acrylate copolymer, styrene-butyl acrylate copolymer, polystyrene, polyvinyl chloride, phenol resin, epoxy resin, polyacrylate, polyester, polyethylene and polypropylene. The mixing ratio of the resin Is 100 to 900 parts by weight, preferably 100 to 400 parts by weight, based on 100 parts by weight of the magnetic particles.

The magnetic toner of the present invention may contain coloring agent, plasticizer, surface lubricant, antistatic agent, etc., in the range which does not deteriorate the dispersibility of the magnetic particles in the binder resin.

A low-molecular resin such as polyethylene or polypropylene may be added, if necessary, as an additive.

In producing the magnetic toner of the present invention, known methods (e.g., a method disclosed in Japanese Patent Application Laid-Open (KOKAI) No. 2-80 (1990) corresponding to U.S. Pat. No. 5,066,558 and Japanese Patent Application Laid-Open (KOKAI) No. 2-181757 (1990)) may be adopted.

The particle diameter of the magnetic toner of the present invention is 3 to 15 μm, preferably 5 to 12 μm.

The most important point of the invention of the iron oxide particles is the fact that by subjecting a mixture composed of 0.1 to 12 parts by weight of non-magnetic fine iron oxide and/or hydrous iron oxide particles based on 100 parts by weight of the granular iron oxide particles having an area-average diameter of 0.1 to 1.0 μm, to compaction, shearing and spatula-stroking by a wheel-type kneader or an attrition mill, iron oxide particles with a low oil absorption and an excellent initial dispersibility can be obtained.

Concerning the reason why an initial dispersibility of the iron oxide particles according to the present invention is excellent, the present inventors consider that as noted from a scanning electron micrographic observation, the non-magnetic fine iron oxide and/or hydrous iron oxide particles are adhered on the surfaces of the granular iron oxide particles, thereby forming an unevenness on the said surfaces. The non-magnetic fine iron oxide and/or hydrous iron oxide particles are adhered strongly because of the good adaptability of the said non-magnetic fine iron oxide and/or hydrous iron oxide particles, to the surfaces of the granular iron oxide particles to be treated, and consequently the individual iron oxide particles-are kept in a state of being spaced apart from each other while the interparticle force or magnetic attractive force of the iron oxide particles is weakened, so that in the preparation of a coating material or ink, the agglomerates of iron oxide particles break up easily and quickly into the single particles.

Further, the present inventors consider that the low oil absorption of the iron oxide particles according to the present invention is caused by the fact that because of lowered agglomeration of the said iron oxide particles as mentioned above, linseed oil can easily advance in between the iron oxide particles, thereby allowing sufficient wetting of the iron oxide particle surfaces with a small amount of linseed oil.

In accordance with the present invention, there can be obtained the iron oxide particles having the non-magnetic fine iron oxide and/or hydrous iron oxide particles adhered thereto with an adhesive strength of not less than 50, preferably 60 to 100.

Also, in accordance with the present invention, there are provided the iron oxide particles which, in the case of magnetite particles, have an oil absorption of not more than 25 ml/100 g, preferably not more than 24 ml/100 g.

In accordance with the present invention, there are further provided the iron oxide particles with an initial dispersibility of not less than 1.3, preferably not less than 1.4.

The L value, which represents tinting strength of the particles, varies depending on the kind and area-average diameter of the iron oxide particles. The iron oxide particles according to the present invention show a high tinting strength in comparison with the ordinary particles of the same kind and same area-average diameter, as illustrated in the Examples and the Comparative Examples described later. This is known from the fact that the particles of the Examples of this invention show a small L value. The difference of L values between Comparative Example and said particles is more than 5 in comparison of, for example, Example 22 with Comparative Example 13 or 16, Example 28 with Comparative Example 14 or 17, and Example 31 with Comparative Example 15 or 18.

It is preferable that the iron oxide particles according to the present invention have a BET specific surface area of 1 to 15 $m^2/g$, a bulk density of 0.5 to 1.1 g/cc and a tap density of 1.0 to 1.8 g/cc.

The iron oxide particles of the present invention are suitable as pigment for coating materials including ink, and pigment for resin molded articles.

A coating material of the present invention is produced by adding the iron oxide particles of the present invention and, if necessary, an organic solvent to a resin and uniformly mixing them. The resin used in the coating material is not specified, and any known coating resin is usable, for example, acrylic-based resin, acrylate-melamine-based resin, polyvinyl chloride-acetate copolymer, alkyd-based resin, polyester, polyurethane and amino-based resin. The organic solvent used in the coating material is not specified, and any known organic solvent for coating materials is usable, for example, toluene, xylene, butyl acetate, methyl ethyl ketone, isobutyl ketone, acetone, methanol, ethanol, butanol and cyclohexane. The mixing ratios of the said component substances of the coating material are as follows: 100 parts by weight of the iron oxide particles: 100 to 10,000 parts by weight, preferably 1,000 to 10,000 parts by weight of the resin; and not more than 10,000 parts by weight, preferably not more than 5,000 parts by weight of the organic solvent.

A resin molded article using the iron oxide particles of the present invention is produced by adding the iron oxide particles of the present invention and an auxiliary agent (e.g., calcium carbonate) and, if necessary, a curing agent to a resin, kneading the resultant mixture and molding the kneaded mixture. The resin used in the molded article is not specified, and any known resin for molded articles is usable, for example, polyvinyl chloride, polyethylene, polypropylene, polyester and unsaturated polyester. The mixing ratio of the resin is 10 to 10,000 parts by weight, preferably 100 to 5,000 parts by weight based on 100 parts by weight of the iron oxide particles.

The magnetic particles for the magnetic toner according to the present invention have a high fluidity, a low oil absorption, an excellent charging stability and a good initial dispersibility, so that they are-suited for use as magnetic particles for magnetic toner.

The iron oxide particles according to the present invention, because of a low oil absorption and an excellent initial dispersibility, are suited for use as a coloring pigment for Coating materials, inks and resins.

EXAMPLES

The present invention is further described with reference to the following examples and comparative examples.

In the Examples and Comparative Examples, the shape of the magnetite particles was observed through a transmission electron microscope and a scanning electron microscope.

The size of the magnetite particles is the area-average diameter calculated from the Martin diameter (the length of the segment bisecting the projected area in a predetermined direction) of a projected particle diameter.

The whole amount of Si and the whole amount of Al in a magnetite particle were determined by a fluorescent X-ray analysis carried out according to "General Rules on Fluorescent X-ray Analyses" of JIS-K-0119 by using a fluorescent X-ray analyzer Model 3063-M (manufactured by. Rigaku Denki Kogyo Co., Ltd).

The amount of Si attached or adhered on the magnetite particle surfaces was determined by measuring the whole amount of Si and the amount of Si contained in the particle by a fluorescent X-ray analysis according to the "General Rules on Fluorescent X-ray Analyses" of JIS-K-0119 by using a fluorescent X-ray analyzer Model 3063-M (manufactured by Rigaku Denki Kogyo Co., Ltd), and subtracting the amount of Si contained in the particle from the whole amount of Si, by following the steps (1)–(8) described below.

The amount of Al existing on the magnetite particle surface was determined in the same way as used for determination of the amount of Si described above.

(1) The whole amount of Si (or Al) in the produced magnetite particles is determined by the fluorescent X-ray analyzer.

(2) 300 ml of a 1N NaOH solution is added to 15 g of magnetite particles and the particles are dispersed by applying ultrasonic waves for 10 minutes.

(3) The dispersion is stirred at 50° C. for 30 minutes.

(4) The stirred dispersion is centrifuged at 10,000 r.p.m. for 10 minutes and the supernatant is separated.

(5) After separation of the supernatant, a 1N NaOH solution is added to the residual solid matter, followed by ultrasonic dispersion for 5 minutes, then the solution is centrifuged for 10 minutes, and the supernatant is separated.

(6) After separation of the supernatant, ion exchange matter is added to residual solid matter, followed by 5-minute ultrasonic dispersion and centrifugation.

(7) The supernatant is removed and the residual solid matter is dried.

(8) The amount of Si (or Al) in the dried product obtained in the step (7) is determined by the fluorescent X-ray analyzer. The thus determined amount of Si (or Al) is represented as the amount of Si (or Al) contained in the magnetite particle.

The whole amounts of Fe, Ti and Zr in the magnetite particles were determined in the same way as above, by carrying out a fluorescent X-ray analysis according to the "General Kules on Fluorescent X-ray Analyses" of JIS-K-0119 using a fluorescent X-ray analyzer Model 3063-M (Rigaku Denki Kogyo Co., Ltd).

The amount of Fe adhered on the magnetite particle surfaces was determined by measuring the whole amount of Fe and the amount of Fe contained in the particle, and subtracting the amount of Fe contained in the particle from the overall amount of Fe, by following the steps (a)–(g) described below.

The amounts of Ti and Zr adhered on the magnetite particle were determined in the same way as the determination method of the amount off Fe described above.

(a) The whole amount of Fe (or Ti or Zr) in the produced magnetite particles is determined by the fluorescent X-ray analyzer. The determined amount is expressed as Ib.

(b) 50 g of sample particles are suspended in 1 liter of ion-exchanged water and treated by an ultrasonic cleaner for 60 minutes.

(c) The spinel-type iron oxide particles are magnetically separated from the non-magnetic fine iron oxide and/or hydrous iron oxide particles.

(d) After removing the supernatant, 1 liter of ion-exchanged water is supplied and the solution is treated by the ultrasonic cleaner for 60 minutes.

(e) After repeating the above operation three times, the supernatant is removed and the residue is dried to obtain a powder. The weight of the sample at this point is measured. The measured value is expressed as X (g).

(f) After ultrasonic cleaning, the whole amount of Fe (or Ti or Zr) in the sample is determined by the fluorescent X-ray analyzer. The determined value is expressed as Ia.

(g) The amount of the non-magnetic fine oxides and/or hydrous oxides particles on the magnetite particle surfaces was determined from the following formula:

$$Is = Ib - Ia \times (X/50)$$

Charging stability of the magnetite particles was determined by repeating 5 times the operation of measuring the amount of charges generated by rubbing the magnetite particles with an iron powder carrier TEFV-200/300 (produced by Nippon Teppun Co., Ltd.) for 30 minutes, by using a blow-off charge meter (manufactured by Toshiba Chemical Co., Ltd. ), and expressing the difference between the maximal value and the minimal value of the five measurements as $\Delta Q$. The smaller the $\Delta Q$ value, the better the charging stability.

For determination of fluidity of the magnetite particles, in view of the close relation between fluidity and compaction degree, the Lap density ($\rho t$) and the bulk density ($\rho a$) of the particles were measured, and the obtained values were introduced into the following formula. The produced value represents fluidity of the particles.

Compaction degree = $[(\rho t - \rho a)/(\rho t)] \times 100$

The smaller the compaction degree, the better is fluidity.

Bulk density was measured according to the pigment testing method of JIS-K-5101.

Tap density was determined as follows 10 g of the magnetite particles whose bulk density had been measured was filled gently in a 20 cc graduated cylinder by using a funnel and the packed cylinder was dropped from a height of 25 mm. After repeating this dropping 600 times, the volume (cc) of the magnetite particles in the cylinder was read from the graduations on the-cylinder and the obtained value was introduced into the following formula.

Tap density (g/cc)=10 (g)/volume (cc)

Oil absorption of the magnetite particles was determined from the pigment testing method of JIS-K-5101.

Initial dispersibility of the magnetite particles was determined in the following way. To 0.5 g of sample particles is added 0.5 ml of castor oil, and the obtained mixture is kneaded by a Huber muller (one turn). The particle size at this point is measured by a grind gage and the obtained value is represented by $\phi_1$. Then 0.5 ml of castor oil is added to 0.5 g of sample and the mixture is kneaded by the Huber muller (5. turns). After repeating this operation twice, the particle size is measured by the grind gage. The obtained value is represented by $\phi_{10}$. The quotient of $\phi_1/\phi_{10}$ is defined as initial dispersibility.

Moisture absorption was determined as follows. The magnetite particles are deaerated at 120° C. for 2 hours by a deaerator BERSORP 18 (manufactured by Japan Bell Corp). The water-vapor adsorption isotherm is measured at the adsorption temperature of 25° C. and the value obtained under the relative pressure of 0.6 is defined as an index of moisture absorption. The greater the value, the higher is moisture-absorption and the worse is environmental stability.

The adhesion strength of the non-magnetic fine oxides and/or hydrous oxides particles of a specific element adhered to the magnetite particle surfaces was determined by the following method (I) or (II):

(I) 50 g of sample magnetite particles are put into a beaker and suspended in 1 liter of ion-exchanged water. The suspension is treated in an ultrasonic cleaner for one minute and the magnetite particles are precipitated. After removing the supernatant, the magnetite particles-are filtered out. The obtained solid is washed with ion exchange water and then dried. The weight of the solid after drying is expressed as Y (g). The amount ($I_{BS}$)of Fe, Ti, Zr, Si or Al before ultrasonic cleaning and the amount ($I_{AS}$) of Fe, Ti, Zr, Si or Al after cleaning are measured by fluorescent X-ray analyzer, and the obtained values are introduced into the following equation.

$I_R=I_S-\{I_{BS}-I_{AS}\times(Y/100)\}$

Adhesive strength=$(I_R/I_S)\times100$ (II) 10 g of sample magnetite particles are put into a beaker and suspended in 200 ml of ion exchange water. The suspension is treated in an ultrasonic cleaner for one minute and the magnetite particles are precipitated. After removing the supernatant, the magnetite particles are filtered out. The obtained solid is washed with ion exchange water and then dried. The total amount ($I_{BSl}$) of Si and the amount of Al before ultra-sonic cleaning and the amount of Si and the total amount ($I_{ASl}$) of Al after cleaning are measured by a fluorescent X-ray analyzer, and the measured values are introduced into the following formula:

Adhesive strength=$(I_{ASl}/I_{BSl})\times100$

Specific surface area was determined according to the BET one-point method by using Mono Sorb (manufactured by Yuasa Ionics Co., Ltd).

The amount of the non-magnetic fine iron oxide and/or hydrous iron oxide particles adhered on the surfaces of the granular iron oxide particles was determined from the change in weight of the particles before and after the ultrasonic cleaning treatment, by following the steps (i) to (v) described below.

(i) 50 g of sample particles are suspended in 1 liter of ion-exchanged water and treated by an ultrasonic cleaner for 60 minutes.

(ii) The supernatant of the suspension of the non-magnetic fine iron oxide and/or hydrous iron oxide particles is removed by means of natural sedimentation.

(iii) After removing the supernatant, ion-exchanged water is freshly supplied to make the amount of ion-exchanged water 1 liter, and the suspension is treated by the ultrasonic cleaner for 60 minutes.

(iv) After repeating the above operation 5 times, the supernatant is removed and the residue is dried to form a powder.

(v) The weight of the sample at this point is measured and the measured value is expressed as X (g).

The amount (wt %) of the non-magnetic fine iron oxide and/or hydrous iron oxide particles is determined from the following formula:

$Y=((50-X)/50)\times100$

The adhesive strength of the non-magnetic fine iron oxide and/or hydrous iron oxide particles adhered on the granular iron oxide particle surfaces was determined in the following way.

50 g of sample particles are put into a beaker and suspended in 1 liter of ion-exchanged water. The suspension is treated in an ultrasonic cleaner for one minute and the iron oxide particles are precipitated. Then the supernatant is removed and the iron oxide-particles are filtered out. The obtained solid matter is washed with ion exchange water and dried. The weight of the solid at this point is expressed as Z. The Z value and the previously measured X value are introduced into the following formula:

Adhesive strength=$\{(Z-X)/(50-X)\}\times100$

Tinting strength was determined in the following way. 0.5 g of iron oxide particles, 1.5 g of titanium white and 1.5 cc of castor oil were kneaded into a paste by a Huber muller. 4.5 g of clear lacquer was added to the obtained paste and kneaded to prepare a coating material. This coating material was coated on a mirror coated paper by using a 6-mil applicator to obtain a colorimetric test piece. This test piece was subjected to colorimetry by using a multiple-light source spectrocolorimeter (MSC-IS-2D, manufactured by Suga Shiken Co., Ltd), and the obtained L value (brightness) was represented as an index of tinting strength. The smaller the L value, the higher is tinting strength and the better is dispersibility.

<Preparation of magnetite particles>

Example 1

To 31.2 liters of a 1.83 mol/l NaOH solution containing 2,770 g of sodium silicate (#3) ($SiO_2$:29 wt %), 18.8 liters of a 1.6N ferrous sulfate solution was added to obtain an aqueous ferrous sulfate solution including $Fe(OH)_2$. The alkali to-iron ratio (2OH/Fe) in this solution was 0.95, and the concentration of $Fe^{2+}$ (including $Fe(OH)_2$) was 0.6 mol/l. Air was passed at a rate of 100 liter/min, through the ferrous sulfate solution containing $Fe(OH)_2$ at 90° C. for 120 minutes to carry out the reaction for forming an aqueous solution containing the magnetite particles.

Then 1.58 liters of 6N NaOH solution (corresponding to 1.10 equivalent to $Fe^{2+}$) was added and air was passed through the solution at a rate of 100 liter/min at 90° C. for 60 minutes to carry out the reaction for forming the magnetite particles. A part of the alkaline suspension containing the magnetite particles was collected and analyzed by a plasma emission spectroscopic analyzer to confirm the presence of Si in the suspension.

To this alkaline suspension containing the magnetite particles, 1.56 liters of a 10% aqueous solution of aluminum sulfate (corresponding to 0.1 wt % based on magnetite) was added and stirred for 30 minutes. Thereafter, 3N dilute sulfuric acid was added to the suspension to adjust its pH to 7. The resultantly formed black precipitate was filtered, washed with water and dried in the usual ways to obtain the black particles.

The result of electron micrographic observation of these black particles showed that they were spherical. The properties of the obtained black particles are shown in Table 2.

In view of the facts that a water-soluble silicate and an aluminum compound are allowed to exist at the same time in the solution, and that the obtained magnetite particles have very excellent charging stability, and silica and alumina are uniformly distributed to level off the charges as compared with the magnetite particles obtained in Comparative Example 5 shown later in which the fine silica particles and the fine alumina particles are deposited in the form of a mixture on the magnetite particle surfaces, it is considered that the magnetite particles according to the present invention .have a hydrous coprecipitate of silica and alumina deposited (attached) thereon.

Examples 2–4 and Comparative Examples 1–4

The procedure of Example 1 was carried out except for Change of the concentration of ferrous hydroxide, the kind and amount added of silicate, the equivalent ratio of alkali added, the reaction temperature, and the kind and amount added of Al compound.

The main preparation conditions used here are shown in Table 1 and the properties of the obtained magnetite particles are shown in Table 2.

The magnetite particles obtained in Examples 2–4 and Comparative Examples 1–4 were all found to have a spherical shape as a result of electron microscopical observation of these particles.

As shown in Table 2, the magnetite particles obtained in Comparative Example 1 had silicon alone deposited (as result of precipitation) on their surfaces. These particles were unsatisfactory in fluidity and showed high oil absorption and poor charging stability.

The magnetite particles obtained in Comparative Example 2 were high in hygroscopity and hence poor in environmental stability because of high Al content in silica-alumina hydrous coprecipitate on the particle surfaces.

The magnetite particles obtained in Comparative Example 3 had aluminum alone deposited (as a result of precipitation) on the surfaces and were poor in fluidity.

The magnetite particles obtained in Comparative Example 4 had high hygroscopicity and Low environmental stability because of high Si content in the silica-alumina hydrous coprecipitate on the particle surfaces.

Comparative Example 5

To an alkaline suspension having formed therein the silica-containing spherical magnetite particles obtained in the same way as Example 3, 3N sulfuric acid was added to adjust the pH of the suspension to 7 and the whole amount of silica existing in the solution was deposited on the magnetite particle surfaces. Then, to this alkaline suspension was added the same μmount of an aluminum sulfate solution as used in Example 3 while maintaining the pH at 7, thereby producing the magnetite particles having the fine silica particles and fine alumina particles deposited in a mixed state on the surfaces.

The properties of the obtained magnetite particles are shown in Table 2.

As shown in Table 2, these particles were poor in fluidity and charging stability as compared with the particles provided according to the present invention.

Examples 5–8

2 kg of the magnetite particles obtained in Examples 1–4 were subjected to 30-minute compaction by a wheel-type kneader Sandmill MPUV-2 (manufactured by Matsumoto Chuzo Tekko Co., Ltd).

The properties of the compacted magnetite particles are shown in Table 2.

Examples 9–12

The same procedure as Example 1 was carried out except for change of the concentration of $Fe(OH)_2$, the kind and amount added of silicate, the equivalent ratio of alkali, the reaction temperature, and the kind and amount added of Al compound.

The main preparation conditions used in the procedure are shown in Table 3, and the properties of the obtained magnetite particles are shown in Table 4.

The magnetite particles obtained in Examples 9–12 were confirmed to be the spherical particles as a result of electron micrographic observation.

<Adhesion Treatment>

Example 13

10 kg of the magnetite particles obtained in Example 1 and 300 g of fine granular $TiO_2$ particles having a diameter of 0.04 μm were mixed and the obtained mixture was treated in a Simpson mix muller under a linear load of 50 kg for 30 minutes to adhere the fine $TiO_2$ particles to the magnetite particles.

Scanning electron micrographic observation of the obtained particles showed that the fine granular $TiO_2$ particles were adhered with proper spaces from each other on the surfaces of the spherical magnetite particles.

The properties of the obtained particles are shown in Table 6.

Examples 14–21

The same procedure as Example 13 was carried out except for change of the kind and amount of the magnetite particles to be treated and the non-magnetic fine oxides or hydrous oxides particles, and the adhering conditions.

Scanning electron micrographical observation showed that the particles obtained in Examples 14–21 were all the spherical magnetite particles having the non-magnetic fine oxides or hydrous oxides particles adhered on the surfaces with proper spaces from each other.

The properties of the obtained particles are shown in Table 6.

Comparative Example 6

The same procedure as Example 13 was carried out except that $TiO_2$ was mixed in an amount of 2 kg. The obtained particles were low in adhesive strength and showed a high oil absorption, bad a charging stability and a poor initial dispersibility. Also, they assumed a grayish tint unfavorable for the magnetic particles to be used for magnetic toner.

Comparative Example 7

The procedure of Example 15 was followed except that the amount of $ZrO_2$ was changed to 2 g. The obtained particles were poor in dispersibility and also unsatisfactory in initial dispersibility.

Comparative Example 8

The same procedure as Example 16 was carried out except for use of the $\alpha$-$Fe_2O_3$ particles with a size of 0.3 μm. The obtained particles were low in adhesive strength and poor in initial dispersibility.

Comparative Example 9

The same procedure as Example 16 was carried out except that the amount of the non-magnetic oxide was changed to 1 g. The obtained particles were poor in initial dispersibility.

Comparative Example 10

The same procedure as Example 18 was carried out except that the amount of the non-magnetic oxide was changed to 2 g. The obtained particles were poor in initial dispersibility.

Comparative Example 11

15 kg of the particles to be treated were suspended in 200 liters of an aqueous alkaline solution. To this suspension was added 259 g of #3 water glass, followed by one-hour stirring at 60° C. with the pH of 8. Thereafter, the suspension was washed with water and dried to obtain dry particles. Electron micrographic observation of the obtained particles showed that no granular silica was present on the particle surfaces, indicating that silica had formed a stratiform structure. By using 10 kg of these particles, the same procedure as Example 19 was carried out except that no $SiO_2$ particles were used. The obtained particles had a high compaction degree and a poor initial dispersibility.

Comparative Example 12

The same procedure as Example 17 was carried out except that a Henschel mixer was used as kneader. The obtained particles, due to their weak adhesive strength to the magnetite particle surfaces, had a high compaction degree, high oil absorption and poor initial dispersibility.

The treating conditions used in the preparation of the treated magnetite particles obtained in Examples 13-21 and Comparative Examples 6-12 are shown in Table 5, and the properties of these particles are shown in Table 6.

Referential 7 Examples 1-11

The particles obtained in Examples 1-4 and Examples 9 to 12 and Comparative Examples 1-3 were treated by using a Simpson mix muller-without adding the fine particles of non-magnetic iron oxide or fine particles of non-magnetic hydrous iron oxide.

The treating conditions and the properties of the obtained treated particles are shown in Table 7.

<Preparation of iron oxide particles>

Example 22

30 g of fine granular hematite particles having a diameter of 0.02 μm wore mixed with 10 kg of granular hematite particles having a particle diameter of 0.20 μm and a BET specific surface area of 6.1 ml/g by a Simpson mix muller under a linear load of 50 kg/cm for 30 minutes. Electron micrographical observation of the obtained particles showed that the fine granular hematite particles were adhered with proper spaces from each other on the surfaces of the granular hematite particles.

The properties of the obtained particles are shown in Table 9.

Examples 23–31 and Comparative Examples 13–18

The same procedure as Example 22 was carried out by changing the kind of the particles to be treated, the kind and amount treated of the non-magnetic fine iron oxide and/or hydrous iron oxide particles, and the treating conditions for adhesion.

It was confirmed that the iron oxide particles obtained in Examples 23–31 and Comparative Examples 16–18 had the-non-magnetic fine iron-oxide and/or hydrous iron oxide particles adhered with proper spaces from each other on the surfaces.

The main preparation conditions used here are shown in Table 8, and the properties of the obtained particles are shown in Table 9.

TABLE 1

| | Preparation of spherical magnetite particles | | | |
|---|---|---|---|---|
| | Concentration | Silicate | | |
| Examples & Comparative Examples | of $Fe(OH)_2$ (mol/l) | Kind | Amount added Si/Fe (mol %) | Equivalent ratio | Reaction temperature (°C.) |
| Ex. 1 | 0.6 | Sodium silicate | 0.9 | 0.95 | 90 |
| Ex. 2 | 0.5 | Potassium silicate | 0.6 | 0.93 | 85 |
| Ex. 3 | 0.8 | Sodium silicate | 1.5 | 0.98 | 95 |
| Ex. 4 | 1.0 | Sodium silicate | 3.0 | 0.91 | 95 |
| Ex. 5 | 0.6 | Sodium silicate | 0.9 | 0.95 | 90 |
| Ex. 6 | 0.5 | Potassium silicate | 0.6 | 0.93 | 85 |
| Ex. 7 | 0.8 | Sodium silicate | 1.5 | 0.98 | 95 |
| Ex. 8 | 1.0 | Sodium silicate | 3.0 | 0.91 | 95 |
| Comp. Ex. 1 | 1.0 | Sodium silicate | 2.3 | 0.95 | 90 |
| Comp. Ex. 2 | 1.0 | Sodium silicate | 0.9 | 0.90 | 95 |

TABLE 1-continued

| Examples & Comparative Examples | | | | | |
|---|---|---|---|---|---|
| Comp. Ex. 3 | 0.7 | Sodium silicate | 0.2 | 0.95 | 90 |
| Comp. Ex. 4 | 0.8 | Sodium silicate | 4.2 | 0.96 | 95 |
| Comp. Ex. 5 | 0.8 | Sodium silicate | 1.5 | 0.98 | 95 |

| Examples & Comparative Examples | Hydrous coprecipitate of silica and alumina | | Compacting treatment Performed: ○ Not performed: — |
|---|---|---|---|
| | Kind of Al compound | Amount added (Al/magnetite) (wt %) | |
| Ex. 1 | Aluminum sulfate | 0.10 | — |
| Ex. 2 | Aluminum sulfate | 1.20 | — |
| Ex. 3 | Aluminum sulfate | 0.30 | — |
| Ex. 4 | Sodium aluminate | 0.70 | — |
| Ex. 5 | Aluminum sulfate | 0.10 | ○ |
| Ex. 6 | Aluminum sulfate | 1.20 | ○ |
| Ex. 7 | Aluminum sulfate | 0.30 | ○ |
| Ex. 8 | Sodium aluminate | 0.70 | ○ |
| Comp. Ex. 1 | Sodium aluminate | 0 | — |
| Comp. Ex. 2 | Sodium aluminate | 3.00 | — |
| Comp. Ex. 3 | Sodium aluminate | 0.40 | — |
| Comp. Ex. 4 | Sodium aluminate | 0.50 | — |
| Comp. Ex. 5 | Sodium aluminate | 0.30 | — |

TABLE 2

| Examples & Comparative Examples | Properties of spherical magnetite particles | | | |
|---|---|---|---|---|
| | Diameter (μm) | Amount of Si in the inside (wt %) | Silica-alumina hydrous coprecipitate | |
| | | | Amount of Si (wt %) | Amount of Al (wt %) |
| Ex. 1 | 0.20 | 0.31 | 0.01 | 0.10 |
| Ex. 2 | 0.09 | 0.20 | 0.02 | 1.17 |
| Ex. 3 | 0.37 | 0.44 | 0.09 | 0.30 |
| Ex. 4 | 0.25 | 0.84 | 0.24 | 0.69 |
| Ex. 5 | 0.20 | 0.31 | 0.01 | 0.10 |
| Ex. 6 | 0.09 | 0.20 | 0.02 | 1.17 |
| Ex. 7 | 0.37 | 0.44 | 0.09 | 0.30 |
| Ex. 8 | 0.25 | 0.84 | 0.24 | 0.69 |
| Comp. Ex. 1 | 0.21 | 0.59 | 0.25 | 0 |
| Comp. Ex. 2 | 0.23 | 0.28 | 0.05 | 2.71 |
| Comp. Ex. 3 | 0.22 | 0.07 | 0 | 0.36 |
| Comp. Ex. 4 | 0.07 | 0.51 | 0.70 | 0.42 |
| Comp. Ex. 5 | 0.37 | 0.44 | 0.09 | 0.27 |

| Examples & Comparative Examples | Properties of spherical magnetite particles | | | | |
|---|---|---|---|---|---|
| | Oil absorption (cc/100 g) | Bulk density ρa (g/cc) | Tap density ρt (g/cc) | Compaction degree (%) | Charging amount (μC/g) |
| Ex. 1 | 19 | 0.63 | 1.40 | 55 | −16.1 |
| Ex. 2 | 18 | 0.65 | 1.32 | 51 | −15.2 |
| Ex. 3 | 17 | 0.58 | 1.30 | 55 | −20.0 |
| Ex. 4 | 19 | 0.55 | 1.23 | 55 | −22.4 |
| Ex. 5 | 16 | 1.02 | 1.49 | 32 | −16.0 |
| Ex. 6 | 15 | 1.09 | 1.52 | 28 | −15.1 |
| Ex. 7 | 17 | 0.98 | 1.45 | 32 | −19.9 |
| Ex. 8 | 17 | 1.12 | 1.58 | 29 | −22.1 |
| Comp. Ex. 1 | 23 | 0.51 | 1.20 | 58 | −19.0 |
| Comp. Ex. 2 | 26 | 0.40 | 1.04 | 62 | −16.2 |
| Comp. Ex. 3 | 21 | 0.39 | 1.13 | 65 | −10.2 |
| Comp. Ex. 4 | 27 | 0.48 | 1.21 | 60 | −24.3 |
| Comp. Ex. 5 | 21 | 0.52 | 1.32 | 61 | −18.0 |

| Examples & Comparative Examples | Properties of spherical magnetite particles | | | |
|---|---|---|---|---|
| | Charging stability (μC/g) | Moisture absorption (%) | Adhesion strength | Initial dispersibility |
| Ex. 1 | 0.6 | 0.3 | 93 | 1.24 |
| Ex. 2 | 0.4 | 0.8 | 94 | 1.16 |
| Ex. 3 | 0.7 | 0.2 | 92 | 1.28 |
| Ex. 4 | 0.8 | 0.6 | 91 | 1.25 |
| Ex. 5 | 0.4 | 0.3 | 98 | — |
| Ex. 6 | 0.3 | 0.7 | 99 | — |
| Ex. 7 | 0.4 | 0.2 | 97 | — |
| Ex. 8 | 0.5 | 0.6 | 96 | — |
| Comp. Ex. 1 | 2.1 | 0.8 | 91 | 1.15 |
| Comp. Ex. 2 | 1.0 | 2.0 | 93 | 1.25 |
| Comp. Ex. 3 | 1.2 | 0.6 | 94 | 1.25 |
| Comp. Ex. 4 | 1.7 | 2.3 | 88 | 1.20 |
| Comp. Ex. 5 | 1.4 | 0.3 | 89 | 1.18 |

TABLE 3

| Examples | Preparation of spherical magnetite particles | | | |
|---|---|---|---|---|
| | Concentration of Fe(OH)$_2$ (mol/l) | Silicate | | |
| | | Kind | | Amount added Si/Fe (mol %) |
| Ex. 9 | 0.6 | Sodium silicate | | 0.9 |
| Ex. 10 | 0.5 | Potassium silicate | | 0.6 |
| Ex. 11 | 0.8 | Sodium silicate | | 1.5 |
| Ex. 12 | 1.0 | Sodium silicate | | 3.0 |

| Examples | Preparation of spherical magnetite particles | | Coprecipitate of silica and alumina Al compound | |
|---|---|---|---|---|
| | Equivalent ratio | Reaction temperature (°C.) | Kind | Amount added Al/magnetite (wt %) |
| Ex. 9 | 0.95 | 90 | Aluminum sulfate | 0.40 |
| Ex. 10 | 0.93 | 85 | Aluminum sulfate | 0.50 |
| Ex. 11 | 0.98 | 95 | Aluminum sulfate | 0.80 |
| Ex. 12 | 0.91 | 95 | Aluminum sulfate | 0.10 |

TABLE 4

| Examples | Properties of spherical magnetite particles | | | |
|---|---|---|---|---|
| | Diameter (μm) | Amount of Si in the inside (wt %) | Silica-alumina hydrous coprecipitate | |
| | | | Amount of Si (wt %) | Amount of Al (wt %) |
| Ex. 9 | 0.20 | 0.31 | 0.01 | 0.38 |
| Ex. 10 | 0.09 | 0.20 | 0.02 | 0.48 |
| Ex. 11 | 0.37 | 0.44 | 0.09 | 0.77 |
| Ex. 12 | 0.25 | 0.84 | 0.24 | 0.10 |

TABLE 4-continued

Properties of spherical magnetite particles

| Examples | Oil absorption (cc/100 g) | Bulk density (g/cc) | Tap density (g/cc) | Compaction degree (%) | Charging amount (μC/g) |
|---|---|---|---|---|---|
| Ex. 9 | 19 | 0.63 | 1.40 | 55 | −14.1 |
| Ex. 10 | 18 | 0.65 | 1.32 | 51 | −17.2 |
| Ex. 11 | 17 | 0.58 | 1.30 | 55 | −14.0 |
| Ex. 12 | 19 | 0.55 | 1.23 | 55 | −25.9 |

Properties of spherical magnetite particles

| Examples | Charging stability (μC/g) | Initial dispersibility |
|---|---|---|
| Ex. 9 | 0.8 | 1.20 |
| Ex. 10 | 0.6 | 1.18 |
| Ex. 11 | 0.9 | 1.29 |
| Ex. 12 | 0.5 | 1.24 |

TABLE 5

| Examples & Comparative Examples | Kind of particles to be treated | Non-magnetic fine oxides or hydrous oxides particles | | | |
|---|---|---|---|---|---|
| | | Kind | Shape | Size (μm) | Amount treated (wt part) |
| Ex. 13 | Ex. 1 | $TiO_2$ | Granular | 0.04 | 3 |
| Ex. 14 | Ex. 1 | $TiOOH_2$ | Granular | 0.05 | 1 |
| Ex. 15 | Ex. 9 | $ZrO_2$ | Granular | 0.03 | 0.5 |
| Ex. 16 | Ex. 2 | $\alpha\text{-}Fe_2O_3$ | Granular | 0.03 | 5 |
| Ex. 17 | Ex. 10 | $\alpha\text{-}FeOOH$ | Needle | 0.10 × 0.02 | 2 |
| Ex. 18 | Ex. 3 | $\alpha\text{-}FeOOH$ | Needle | 0.15 × 0.03 | 8 |
| Ex. 19 | Ex. 11 | $SiO_2$ | Granular | 0.02 | 5 |
| Ex. 20 | Ex. 4 | $Al_2O_3$ | Granular | 0.03 | 4 |
| Ex. 21 | Ex. 12 | $AlOOH$ | Granular | 0.03 | 3 |
| Comp. Ex. 6 | Ex. 1 | $TiO_2$ | Granular | 0.04 | 20 |
| Comp. Ex. 7 | Ex. 9 | $ZrO_2$ | Granular | 0.03 | 0.02 |
| Comp. Ex. 8 | Ex. 2 | $\alpha\text{-}Fe_2O_3$ | Granular | 0.3 | 5 |
| Comp. Ex. 9 | Ex. 2 | $\alpha\text{-}Fe_2O_3$ | Granular | 0.03 | 0.01 |
| Comp. Ex. 10 | Ex. 3 | $\alpha\text{-}FeOOH$ | Needle | 0.15 × 0.03 | 0.02 |
| Comp. Ex. 11 | Ex. 4 | — | — | — | — |
| Comp. Ex. 12 | Ex. 10 | $\alpha\text{-}FeOOH$ | Needle | 0.10 × 0.02 | 2 |

| Examples & Comparative Examples | Kneading conditions | | |
|---|---|---|---|
| | Kind of machine | Linear load (kg/cm) | Working time (min) |
| Ex. 13 | Simpson mix muller | 50 | 30 |
| Ex. 14 | | 70 | 30 |
| Ex. 15 | | 70 | 30 |
| Ex. 16 | | 30 | 40 |
| Ex. 17 | | 40 | 30 |
| Ex. 18 | | 60 | 30 |
| Ex. 19 | | 50 | 30 |
| Ex. 20 | | 40 | 40 |
| Ex. 21 | | 40 | 50 |
| Comp. Ex. 6 | Simpson mix muller | 50 | 30 |
| Comp. Ex. 7 | | 70 | 30 |
| Comp. Ex. 8 | | 30 | 40 |
| Comp. Ex. 9 | | 30 | 40 |
| Comp. Ex. 10 | | 60 | 30 |
| Comp. Ex. 11 | | 50 | 30 |
| Comp. Ex. 12 | Henschel mixer | 40 | 30 |

TABLE 6

Properties of magnetite particles

| Examples & Comparative Examples | Diameter (μm) | BET specific surface area (m²/g) | Amount of Si in the inside (wt %) | Amount of Si in the surface (wt %) |
|---|---|---|---|---|
| Ex. 13 | 0.24 | 8.0 | 0.30 | 0.01 |
| Ex. 14 | 0.24 | 8.0 | 0.31 | 0.01 |
| Ex. 15 | 0.24 | 8.3 | 0.31 | 0.01 |
| Ex. 16 | 0.12 | 14.5 | 0.19 | 0.02 |
| Ex. 17 | 0.10 | 16.2 | 0.20 | 0.02 |
| Ex. 18 | 0.38 | 5.8 | 0.39 | 0.09 |
| Ex. 19 | 0.38 | 5.4 | 0.42 | 0.09 |
| Ex. 20 | 0.26 | 7.3 | 0.81 | 0.23 |
| Ex. 21 | 0.26 | 7.8 | 0.82 | 0.23 |
| Comp. Ex. 6 | 0.24 | 10.4 | 0.26 | 0.01 |
| Comp. Ex. 7 | 0.24 | 8.3 | 0.31 | 0.01 |
| Comp. Ex. 8 | 0.12 | 14.5 | 0.19 | 0.02 |
| Comp. Ex. 9 | 0.09 | 13.8 | 0.20 | 0.02 |
| Comp. Ex. 10 | 0.37 | 5.0 | 0.42 | 0.09 |
| Comp. Ex. 11 | 0.38 | 8.4 | 0.43 | 0.08 |
| Comp. Ex. 12 | 0.10 | 16.6 | 0.20 | 0.02 |

Properties of magnetite particles

| Examples & Comparative Examples | Amount of Al in the surface (wt %) | Amount of non-magnetic fine oxides or hydrous oxides particles (wt %) | Adhesion strength | magnetization (emu/g) |
|---|---|---|---|---|
| Ex. 13 | 0.10 | 2.82 | 85 | 82.0 |
| Ex. 14 | 0.10 | 0.91 | 92 | 83.2 |
| Ex. 15 | 0.36 | 0.53 | 95 | 84.5 |
| Ex. 16 | 1.11 | 4.61 | 70 | 80.0 |
| Ex. 17 | 0.47 | 1.92 | 94 | 81.2 |
| Ex. 18 | 0.27 | 7.08 | 73 | 78.7 |
| Ex. 19 | 0.73 | 4.57 | 81 | 81.0 |
| Ex. 20 | 0.66 | 3.55 | 78 | 81.2 |
| Ex. 21 | 0.10 | 2.72 | 90 | 81.6 |
| Comp. Ex. 6 | 0.08 | 9.51 | 35 | 70.7 |
| Comp. Ex. 7 | 0.10 | — | — | 84.5 |
| Comp. Ex. 8 | 1.11 | 0.21 | 5 | 80.0 |
| Comp. Ex. 9 | 0.48 | 0.01 | 95 | 83.0 |
| Comp. Ex. 10 | 0.20 | 0.02 | 97 | 84.6 |
| Comp. Ex. 11 | 0.76 | 0.52 | 90 | 84.1 |
| Comp. Ex. 12 | 0.47 | 0.09 | 3 | 81.3 |

Properties of magnetite particles

| Examples & Comparative Examples | Residual magnetization (emu/g) | ρa (g/cc) | ρt (g/cc) | Compaction degree (%) |
|---|---|---|---|---|
| Ex. 13 | 3.9 | 1.03 | 1.49 | 31 |
| Ex. 14 | 4.0 | 1.05 | 1.52 | 31 |
| Ex. 15 | 4.0 | 1.04 | 1.50 | 31 |
| Ex. 16 | 8.6 | 1.08 | 1.48 | 27 |
| Ex. 17 | 8.7 | 1.09 | 1.49 | 27 |
| Ex. 18 | 2.7 | 1.04 | 1.51 | 31 |
| Ex. 19 | 2.9 | 1.03 | 1.50 | 31 |
| Ex. 20 | 3.6 | 1.10 | 1.56 | 29 |
| Ex. 21 | 3.6 | 1.11 | 1.57 | 29 |
| Comp. Ex. 6 | 3.3 | 0.85 | 1.42 | 40 |
| Comp. Ex. 7 | 4.0 | 1.04 | 1.50 | 31 |
| Comp. Ex. 8 | 8.6 | 1.08 | 1.48 | 27 |
| Comp. Ex. 9 | 8.8 | 1.04 | 1.51 | 31 |
| Comp. Ex. 10 | 3.0 | 1.02 | 1.49 | 32 |

TABLE 6-continued

| | | | | |
|---|---|---|---|---|
| Comp. Ex. 11 | 3.7 | 0.75 | 1.56 | 48 |
| Comp. Ex. 12 | 8.8 | 0.53 | 1.12 | 53 |

| | Properties of magnetite particles | | | |
|---|---|---|---|---|
| Examples & Comparative Examples | Oil absorption (ml/100 g) | Charging amount (μC/g) | Charging stability (μC/g) | Initial dispersibility |
| Ex. 13 | 15 | −17.4 | 0.4 | 1.85 |
| Ex. 14 | 17 | −16.6 | 0.6 | 1.74 |
| Ex. 15 | 16 | −14.6 | 0.6 | 1.69 |
| Ex. 16 | 14 | −15.2 | 0.3 | 1.56 |
| Ex. 17 | 16 | −17.0 | 0.5 | 1.53 |
| Ex. 18 | 16 | −19.5 | 0.4 | 2.15 |
| Ex. 19 | 17 | −15.2 | 0.7 | 2.23 |
| Ex. 20 | 16 | −11.1 | 0.6 | 1.86 |
| Ex. 21 | 17 | −19.0 | 0.4 | 1.90 |
| Comp. Ex. 6 | 24 | −12.4 | 3.4 | 1.33 |
| Comp. Ex. 7 | 22 | −14.6 | 0.6 | 1.29 |
| Comp. Ex. 8 | 20 | −15.2 | 2.3 | 1.25 |
| Comp. Ex. 9 | 18 | −16.0 | 0.7 | 1.24 |
| Comp. Ex. 10 | 18 | −19.0 | 0.5 | 1.37 |
| Comp. Ex. 11 | 23 | −18.1 | 1.2 | 1.12 |
| Comp. Ex. 12 | 27 | −16.8 | 3.5 | 1.08 |

TABLE 7

| Reference Example | Kind of the particles to be treated | Kneading conditions | | |
|---|---|---|---|---|
| | | Kind of machine | Linear load (kg/cm) | Working time (min.) |
| Ref. Ex. 1 | Ex. 1 | Simpson mix muller (Matsumoto Chuzo Co., Ltd.) | 50 | 30 |
| Ref. Ex. 2 | Ex. 9 | | 70 | 30 |
| Ref. Ex. 3 | Ex. 2 | | 30 | 40 |
| Ref. Ex. 4 | Ex. 10 | | 40 | 30 |
| Ref. Ex. 5 | Ex. 3 | | 60 | 30 |
| Ref. Ex. 6 | Ex. 11 | | 50 | 30 |
| Ref. Ex. 7 | Ex. 4 | | 40 | 40 |
| Ref. Ex. 8 | Ex. 12 | | 40 | 50 |
| Ref. Ex. 9 | Comp. Ex. 1 | | 40 | 30 |
| Ref. Ex. 10 | Comp. Ex. 2 | | 60 | 30 |
| Ref. Ex. 11 | Comp. Ex. 3 | | 50 | 30 |

| | Oil absorption (cc/100 g) | Bulk density ρa (g/cc) | Tap density ρt (g/cc) | Compaction degree (%) |
|---|---|---|---|---|
| Ref. Ex. 1 | 16 | 1.02 | 1.49 | 32 |
| Ref. Ex. 2 | 17 | 1.02 | 1.54 | 34 |
| Ref. Ex. 3 | 15 | 1.09 | 1.52 | 28 |
| Ref. Ex. 4 | 16 | 1.08 | 1.58 | 32 |
| Ref. Ex. 5 | 17 | 0.98 | 1.45 | 32 |
| Ref. Ex. 6 | 18 | 0.98 | 1.48 | 34 |
| Ref. Ex. 7 | 17 | 1.12 | 1.58 | 29 |
| Ref. Ex. 8 | 18 | 1.12 | 1.58 | 30 |
| Ref. Ex. 9 | 22 | 0.90 | 1.48 | 39 |
| Ref. Ex. 10 | 24 | 0.85 | 1.42 | 40 |
| Ref. Ex. 11 | 20 | 0.80 | 1.44 | 44 |

| | Charging amount (μc/g) | Charging stability (μC/g) | Initial dispersibility |
|---|---|---|---|
| Ref. Ex. 1 | −16.0 | 0.4 | 1.31 |
| Ref. Ex. 2 | −14.0 | 0.7 | 1.28 |
| Ref. Ex. 3 | −15.1 | 0.3 | 1.25 |
| Ref. Ex. 4 | −17.0 | 0.5 | 1.24 |
| Ref. Ex. 5 | −19.9 | 0.4 | 1.37 |
| Ref. Ex. 6 | −13.8 | 0.7 | 1.34 |
| Ref. Ex. 7 | −22.0 | 0.7 | 1.30 |
| Ref. Ex. 8 | −25.0 | 0.4 | 1.33 |
| Ref. Ex. 9 | −19.2 | 1.7 | 1.14 |
| Ref. Ex. 10 | −15.8 | 1.1 | 1.20 |
| Ref. Ex. 11 | −10.1 | 1.1 | 1.18 |

TABLE 8

| | Particles to be treated | | | |
|---|---|---|---|---|
| Examples & Comparative Examples | Kind | Shape | Diameter (μm) | BET specific surface area (m²/g) |
| Ex. 22 | Hematite | Granular | 0.20 | 6.1 |
| Ex. 23 | Hematite | Granular | 0.20 | 6.1 |
| Ex. 24 | Hematite | Granular | 0.61 | 2.4 |
| Ex. 25 | Hematite | Granular | 0.61 | 2.4 |
| Ex. 26 | Magnetite | Spherical | 0.25 | 6.5 |
| Ex. 27 | Magnetite | Octahedral | 0.48 | 3.5 |
| Ex. 28 | Magnetite | Hexahedral | 0.18 | 7.0 |
| Ex. 29 | Maghemite | Granular | 0.28 | 4.3 |
| Ex. 30 | Maghemite | Granular | 0.65 | 2.7 |
| Ex. 31 | Maghemite | Granular | 0.24 | 4.8 |
| Comp. Ex. 13 | Hematite | Granular | 0.20 | 6.1 |
| Comp. Ex. 14 | Magnetite | Hexehedral | 0.18 | 7.0 |
| Comp. Ex. 15 | Maghemite | Granular | 0.24 | 4.8 |
| Comp. Ex. 16 | Hematite | Granular | 0.20 | 6.1 |
| Comp. Ex. 17 | Magnetite | Hexahedral | 0.18 | 7.0 |
| Comp. Ex. 18 | Maghemite | Granular | 0.24 | 4.8 |

| | Non-magnetic fine iron oxide particles or non-magnetic fine hydrous iron oxide particles | | | |
|---|---|---|---|---|
| Examples & Comparative Examples | Kind | Shape | Size (μm) | Amount treated (wt parts) |
| Ex. 22 | α-Fe₂O₃ | Granular | 0.02 | 0.3 |
| Ex. 23 | α-Fe₂O₃ | Granular | 0.05 | 3.0 |
| Ex. 24 | α-FeOOH | Acicular | *0.12:0.02 | 4.0 |
| Ex. 25 | γ-FeOOH | Acicular | *0.15:0.03 | 1.5 |
| Ex. 26 | α-Fe₂O₃ | Granular | 0.05 | 2.5 |
| Ex. 27 | α-FeOOH | Acicular | *0.15:0.03 | 0.5 |
| Ex. 28 | α-FeOOH | Acicular | *0.12:0.025 | 4.5 |
| Ex. 29 | α-Fe₂O₃ | Granular | 0.05 | 2.5 |
| Ex. 30 | γ-FeOOH | Acicular | *0.15:0.03 | 0.5 |
| Ex. 31 | α-FeOOH | Acicular | *0.12:0.025 | 4.5 |
| Comp. Ex. 13 | — | — | — | 0 |
| Comp. Ex. 14 | — | — | — | 0 |
| Comp. Ex. 15 | — | — | — | 0 |
| Comp. Ex. 16 | α-Fe₂O₃ | Granular | 0.05 | 20 |
| Comp. Ex. 17 | α-Fe₂O₃ | Granular | 0.20 | 2.5 |
| Comp. Ex. 18 | α-FeOOH | Acicular | *0.12:0.025 | 4.5 |

| Examples & Comparative Examples | Treating conditions | | |
|---|---|---|---|
| | Kind of machine used (ml/100 g) | Linear load (kg/cm) | Working time (min) |
| Ex. 22 | Simpson mix Muller (Matsumoto Chuzo Co., Ltd.) | 50 | 30 |
| Ex. 23 | | 60 | 20 |
| Ex. 24 | | 50 | 40 |
| Ex. 25 | | 50 | 30 |
| Ex. 26 | | 40 | 30 |
| Ex. 27 | | 50 | 30 |
| Ex. 28 | | 40 | 50 |
| Ex. 29 | | 40 | 30 |
| Ex. 30 | | 50 | 30 |
| Ex. 31 | | 30 | 60 |
| Comp. Ex. 13 | Simpson mix Muller (Matsumoto Chuzo Co., Ltd.) | 50 | 30 |
| Comp. Ex. 14 | | 40 | 30 |
| Comp. Ex. 15 | | 30 | 50 |
| Comp. Ex. 16 | | 60 | 20 |
| Comp. Ex. 17 | | 40 | 30 |
| Comp. Ex. 18 | Henschel mixer | 30 | 60 |

*: shows major axial diameter:minor axial diameter

TABLE 9

| Examples & Comparative Examples | Properties of granular iron oxide particles | | | |
|---|---|---|---|---|
| | Diameter (μm) | Amount of fine particles (wt %) | BET specific surface area (m²/g) | Adhesion strength |
| Ex. 22 | 0.20 | 0.3 | 6.8 | 91 |
| Ex. 23 | 0.21 | 2.4 | 6.3 | 76 |
| Ex. 24 | 0.62 | 3.8 | 2.9 | 71 |
| Ex. 25 | 0.62 | 1.4 | 2.9 | 80 |
| Ex. 26 | 0.26 | 2.4 | 6.6 | 73 |
| Ex. 27 | 0.48 | 0.5 | 3.5 | 84 |
| Ex. 28 | 0.18 | 4.2 | 7.9 | 65 |
| Ex. 29 | 0.28 | 2.4 | 5.4 | 78 |
| Ex. 30 | 0.65 | 0.5 | 2.7 | 90 |
| Ex. 31 | 0.24 | 4.2 | 8.2 | 72 |
| Comp. Ex. 13 | 0.20 | — | 6.0 | — |
| Comp. Ex. 14 | 0.18 | — | 6.8 | — |
| Comp. Ex. 15 | 0.24 | — | 4.6 | — |
| Comp. Ex. 16 | 0.21 | 1.2 | 10.1 | 45 |
| Comp. Ex. 17 | 0.26 | 0.3 | 6.4 | 15 |
| Comp. Ex. 18 | 0.24 | 1.2 | 7.2 | 12 |

| Examples & Comparative Examples | Properties of granular iron oxide particles | | | | |
|---|---|---|---|---|---|
| | ρa (g/cc) | ρt (g/cc) | Oil absorption (ml/100 g) | Initial dispersibility | L value |
| Ex. 22 | 0.75 | 1.30 | 20.4 | 1.73 | 54.0 |
| Ex. 23 | 0.81 | 1.32 | 18.8 | 1.71 | 53.5 |
| Ex. 24 | 0.94 | 1.62 | 16.8 | 1.88 | 57.2 |
| Ex. 25 | 0.92 | 1.58 | 20.0 | 1.75 | 59.5 |
| Ex. 26 | 0.78 | 1.53 | 17.2 | 1.80 | 41.3 |
| Ex. 27 | 0.85 | 1.61 | 24.6 | 1.71 | 44.8 |
| Ex. 28 | 0.62 | 1.28 | 20.4 | 1.68 | 43.4 |
| Ex. 29 | 0.87 | 1.54 | 21.2 | 1.81 | 52.3 |
| Ex. 30 | 0.64 | 1.48 | 16.8 | 1.68 | 54.7 |
| Ex. 31 | 0.70 | 1.51 | 23.2 | 1.81 | 50.2 |
| Comp. Ex. 13 | 0.78 | 1.34 | 25.4 | 1.14 | 59.2 |
| Comp. Ex. 14 | 0.64 | 1.31 | 26.8 | 1.24 | 48.9 |
| Comp. Ex. 15 | 0.73 | 1.42 | 28.2 | 1.31 | 56.6 |
| Comp. Ex. 16 | 0.58 | 1.14 | 29.8 | 1.08 | 60.2 |
| Comp. Ex. 17 | 0.72 | 1.38 | 26.2 | 1.23 | 52.4 |
| Comp. Ex. 18 | 0.70 | 1.51 | 27.2 | 1.14 | 57.2 |

What is claimed is:

1. Magnetic particles having an area-average diameter of 0.05 to 1.0 μm, a compaction degree of not more than 60%, an oil absorption of more than 20 ml/100 g and a charging stability of not more than 1.0 μC/g, which magnetic particles comprise:

magnetite core particles containing a silicon compound in the inside thereof, and a hydrous coprecipitate of silica and alumina deposited or adhered on the surfaces of the magnetite core particles, wherein the elemental silicon content of the silicon compound in the magnetite core particles is 0.10 to 1.00 wt % based on the weight of the magnetic particles, the elemental silicon content in the hydrous coprecipitate composed of silica and alumina is 0.01 to 0.5 wt % based on the weight of the magnetic particles, and the elemental aluminum content in the hydrous coprecipitate composed of silica and alumina is 0.01 to 2.0 wt % based on the weight of the magnetic particles.

2. Magnetic particles according to claim 1, wherein the magnetite core particles are spherical and the magnetic particles are spherical.

3. Magnetic particles according to claim 1, wherein the molar ratio of silica to alumina in the hydrous coprecipitate is 10:1 to 1:100.

4. Magnetic particles having an area-average diameter of 0.05 to 1.0 μm, a compaction degree of not more than 60%, an oil absorption of not more than 20 ml/100 g and a charging stability of not more than 1.0 μC/g, which magnetic particles comprise:

magnetite core particles containing a silicon compound in the inside thereof, and a hydrous coprecipitate of silica and alumina deposited or adhered on the surfaces of the magnetite core particles, wherein the elemental silicon content of the silicon compound in the magnetite core particles is 0.10 to 1.00 wt % based on the weight of the magnetic particles, the elemental silicon content in the hydrous coprecipitate composed of silica and alumina is 0.01 to 0.5 wt % based on the weight of the magnetic particles, and the elemental aluminum content in the hydrous coprecipitate composed of silica and alumina is 0.01 to 2.0 wt % based on the weight of the magnetic particles, wherein said particles are produced by the process off (a) reacting an aqueous ferrous salt solution and an aqueous alkali hydroxide solution of an amount of 0.90 to 0.99 equivalent to $Fe^{2+}$ in said ferrous salt solution, and adding a water-soluble silicate in an amount of 0.4 to 4.0 mol %, calculated as Si, based on Fe, to (1) said aqueous alkali hydroxide solution prior to reaction with the aqueous ferrous salt solution or (2) the produced ferrous salt reaction solution containing colloidal ferrous hydroxide;

(b) oxidizing the ferrous salt reaction solution of step (a) by passing an oxygen-containing gas through said ferrous salt reaction solution containing colloidal ferrous hydroxide while heating at 85° to 100° C.;

(c) adding an aqueous alkali hydroxide solution in an amount of not less than 1.00 equivalent to $Fe^{2+}$ remaining in suspension after completion of the oxidation reaction;

(d) oxidizing the product of step (c) while heating at 85° to 100° C. to produce the spherical magnetite particles containing a silicon compound in an alkaline suspension containing residual silicate; then (e) adding a water-soluble aluminum salt to the alkaline suspension containing residual silicate; and (f) adjusting the pH of the suspension to 5 to 9, thereby causing said residual silicate and the water-soluble aluminum salt added in step (e) to deposit or adhere on the surfaces of said spherical magnetite particles as a hydrous coprecipitate composed of silica and alumina.

5. Magnetic particles according to claim 4, comprising the additional step of:

(g) drying the particles; and (h) subjecting the particles to compaction treatment, shearing and spatula-stroking by using a wheel-type kneader or an attrition mill.

6. Magnetic particles having after compaction treatment an average diameter of 0.05 to 1.0 μm, a compaction degree of not more than 40%, an oil absorption of not more than 18 ml/100 g, a charging stability of not more than 0.8 μC/g and an initial dispersibility in resin of not less than 1.4, and the magnetic particles prior to compaction treatment having an area-average diameter of 0.05 to 1.0 μm, a compaction degree of not more than 60%, an oil absorption of not more than 20 ml/100 g and a charging stability of not more than 1.0 μC/g, which magnetic particles comprise magnetite core particles containing a silicon compound in the inside thereof, and a hydrous coprecipitate of silica and alumina deposited or adhered on the surfaces of the magnetite core particles, wherein the elemental silicon content of the silicon compound in the magnetite core particles is 0.10 to 1.00 wt % based on the weight of the magnetic particles, the elemental silicon content in the hydrous coprecipitate composed of silica and alumina is 0.01 to 0.5 wt % based on the weight of the magnetic particles, and the elemental aluminum content in the hydrous coprecipitate composed of silica and alumina is 0.01 to 2.0 wt % based on the weight of the magnetic particles and adhered on said magnetic particle surfaces, non-magnetic oxides particles, non-magnetic hydrous oxides particles or mixed particles thereof, which contain at least one element selected from the group consisting of Fe, Ti, Zr, Si and Al, wherein the amount of non-magnetic oxides particles, non-magnetic hydrous oxides particles or mixed fine particles is 0.1 to 10 wt % based on the magnetic particles prior to compaction.

7. Magnetic particles according to claim 6, wherein the non-magnetic oxides particles are granular, acicular, spindle or plate-like hematite particles, granular or columnar $TiO_2$ particles, granular $SiO_2$ particles, or granular or acicular $Al_2O_3$ particles, and the non-magnetic hydrous oxides particles are granular, acicular, spindle or plate goethite, lepidocrocite or akageneite particles, granular AlOOH particles, or granular $TiOOH_2$ particles.

8. Magnetic particles according to claim 6, wherein the non-magnetic oxides particles, non-magnetic hydrous oxides particles or mixed particles thereof are particles which satisfy the following formulae:

in case of granular particles $1/100 \leq b/a \leq 1/3$ in case of acicular, spindle or plate particles:

$1/100 \leq c/a \leq 1$ $1/100 \leq d/a \leq 1/3$ $1/100 \leq d/c \leq 1$ wherein a is an average particle diameter of the magnetic particles having an area-average diameter of 0.05 to 1.0 μm, a compaction degree of not more than 60%, an oil absorption of not more than 20 ml/100 g and a charging stability of not more than 1.0 μC/g, which magnetic particles comprise magnetite core particles containing a silicon compound in the inside thereof, and a hydrous coprecipitate of silica and alumina deposited or adhered on the surfaces of the magnetite core particles, wherein the elemental silicon content of the silicon compound in the magnetite core particles is 0.10 to 1.00 wt % based on the weight of the magnetic particles, the elemental silicon content in the hydrous coprecipitate composed of silica and alumina is 0.01 to 0.5 wt % based on the weight of the magnetic particles, and the elemental aluminum content in the hydrous coprecipitate composed of silica and alumina is 0.01 to 2.0 wt % based on the weight of the magnetic particles, b is an average particle diameter of the non-magnetic oxides particles, non-magnetic hydrous oxides particles or mixed particles thereof in case of granular, c is an average major axial diameter or an average plate-surface diameter of the non-magnetic oxides particles, non-magnetic hydrous oxides particles or mixed particles thereof in case of acicular, columnar, spindle or plate, and d is an average minor axial diameter of the non-magnetic oxides particles, non-magnetic hydrous oxides particles or mixed particles thereof in case of acicular, columnar or spindle, or an average thickness of plate in case of plate particles.

9. Magnetic particles having after compaction treatment an average diameter of 0.05 to 1.0 μm, a compaction degree of not more than 40%, an oil absorption of not more than 18 ml/100 g, a charging stability of not more than 0.8 μC/g and an initial dispersibility in resin of not less than 1.4, and the magnetic particles prior to compaction treatment having an area-average diameter of 0.05 to 1.0 μm, a compaction degree of not more than 60%, an oil absorption of not more than 20 ml/100 g and a charging stability of not more than 1.0 μC/g, which magnetic particles comprise magnetite core particles containing a silicon compound in the inside thereof, and a hydrous coprecipitate of silica and alumina deposited or adhered on the surfaces of the magnetite core particles, wherein the elemental silicon content of the silicon compound in the magnetite core particles is 0.10 to 1.00 wt % based on the weight of the magnetic particles, the elemental silicon content in the hydrous coprecipitate composed of silica and alumina is 0.01 to 0.5 wt % based on the weight of the magnetic particles, and the elemental aluminum content in the hydrous coprecipitate composed of silica and alumina is 0.01 to 2.0 wt % based on the weight of the magnetic particles wherein said particles prior to compaction are produced by:

(a) adding non-magnetic oxides particles, non-magnetic hydrous oxides particles or mixed particles thereof containing at least one element selected from the group consisting of Fe, Ti, Zr, Si and Al in an amount of 0.1 to 25 parts by weight to 100 parts by weight of said magnetic particles; and (b) subjecting the product of step (a) to compaction, shearing end spatula-stroking.

* * * * *